(12) United States Patent
Ryan

(10) Patent No.: US 10,974,556 B2
(45) Date of Patent: Apr. 13, 2021

(54) BOAT WITH RETRACTABLE WHEELS

(71) Applicant: CrocTrax Amphibious Technologies Pty Ltd, Red Hill (AU)

(72) Inventor: Andrew Vincent Ryan, Brisbane (AU)

( * ) Notice: Subject to any disclaimer, the term of this patent is extended or adjusted under 35 U.S.C. 154(b) by 43 days.

(21) Appl. No.: 16/309,246

(22) PCT Filed: Jun. 13, 2017

(86) PCT No.: PCT/AU2017/050588
§ 371 (c)(1),
(2) Date: Dec. 12, 2018

(87) PCT Pub. No.: WO2017/214667
PCT Pub. Date: Dec. 21, 2017

(65) Prior Publication Data
US 2019/0337345 A1 Nov. 7, 2019

(30) Foreign Application Priority Data

Jun. 13, 2016 (AU) .............................. 2016902286

(51) Int. Cl.
*B63B 21/64* (2006.01)
*B63C 13/00* (2006.01)
*B60P 3/10* (2006.01)
*B60F 3/00* (2006.01)
*B63H 19/08* (2006.01)

(52) U.S. Cl.
CPC .................................... *B60F 3/003* (2013.01)

(58) Field of Classification Search
CPC .......... B60F 3/00; B60F 3/003; B60F 3/0061; B60F 3/0069; B60F 2301/00; B60F 2301/04

USPC .......... 440/12.5, 12.51, 12.52, 12.53, 12.54; 114/344

See application file for complete search history.

(56) References Cited

U.S. PATENT DOCUMENTS

| | | | | |
|---|---|---|---|---|
| 2,781,529 A * | 2/1957 | Moody | ................... | B63C 13/00 114/344 |
| 3,755,835 A * | 9/1973 | Boersig | ................... | B63C 13/00 114/344 |
| 3,902,741 A * | 9/1975 | Rudder | ................... | B63C 13/00 114/344 |
| 5,520,138 A * | 5/1996 | Humphrey | ................ | B60F 3/00 114/274 |
| 5,632,221 A * | 5/1997 | Trenne | ................... | B60F 3/003 114/344 |
| 6,159,058 A | 12/2000 | Matheson | | |
| 6,811,454 B2 * | 11/2004 | Royle | ....................... | B60F 3/00 440/12.5 |

(Continued)

FOREIGN PATENT DOCUMENTS

EP       1047591 B1    12/1998

*Primary Examiner* — Daniel V Venne
(74) *Attorney, Agent, or Firm* — Michael Buck IP

(57) ABSTRACT

A boat is fitted with retractable wheels which can pivot between an extended land position and a retracted water position. A slot is formed in the hull of the boat. A housing sealing engages about the slot to prevent water entering the boat through the slot. The housing supports a pivot. An arm member is connected to the pivot and a wheel is connected to the arm member. The arm member can pivot through the slot between the wheel retracted and wheel extended positions.

17 Claims, 22 Drawing Sheets

(56) References Cited

U.S. PATENT DOCUMENTS

| | | | |
|---|---|---|---|
| 7,004,801 B2 * | 2/2006 | Bryham | B60F 3/0007 |
| | | | 440/12.54 |
| 7,520,239 B2 * | 4/2009 | Bryham | B60F 3/003 |
| | | | 114/344 |
| 8,025,540 B2 * | 9/2011 | Gibbs | B60F 3/0007 |
| | | | 440/12.5 |
| 9,555,680 B2 * | 1/2017 | Gibbs | B60F 3/0084 |

* cited by examiner

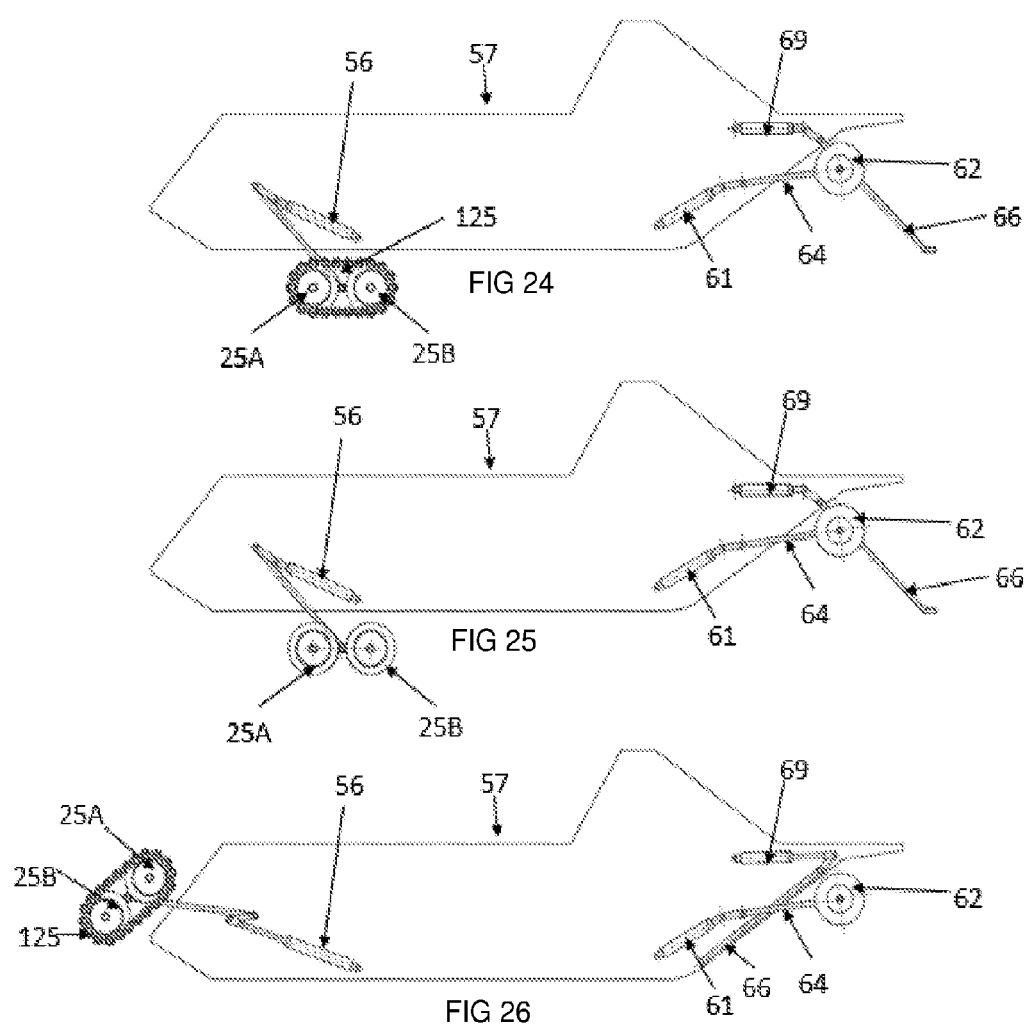

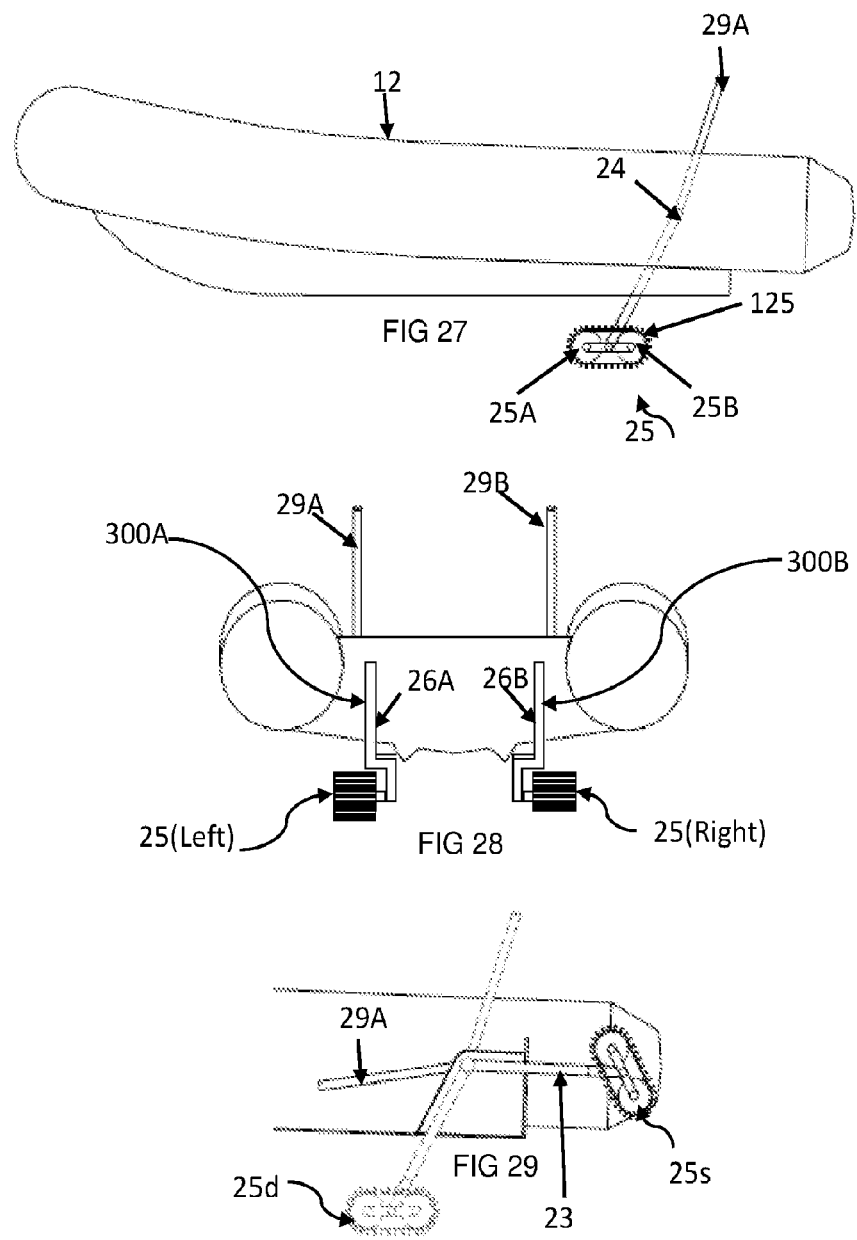

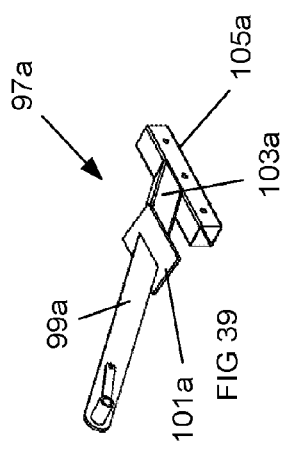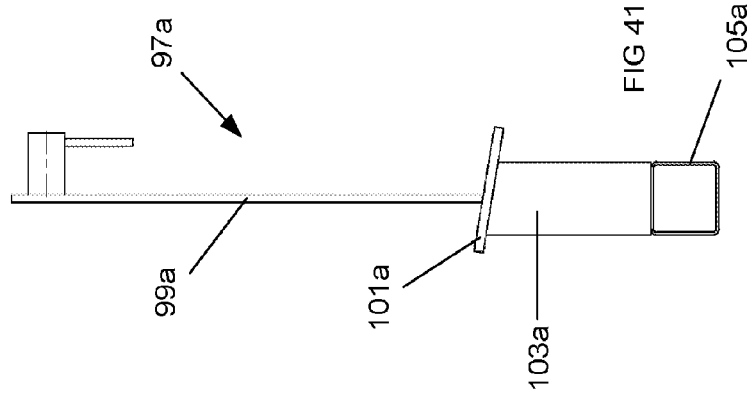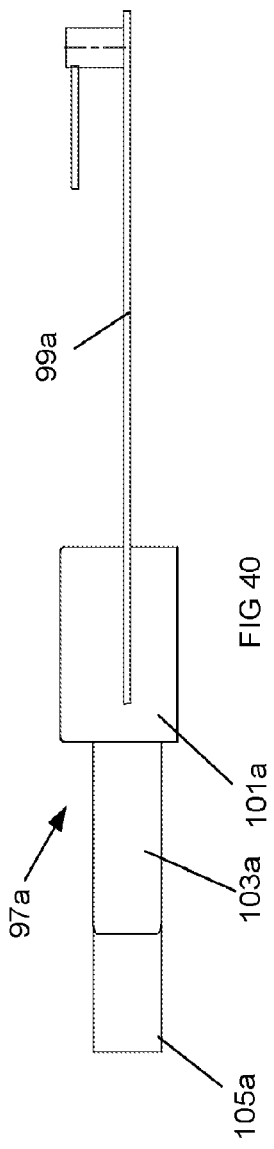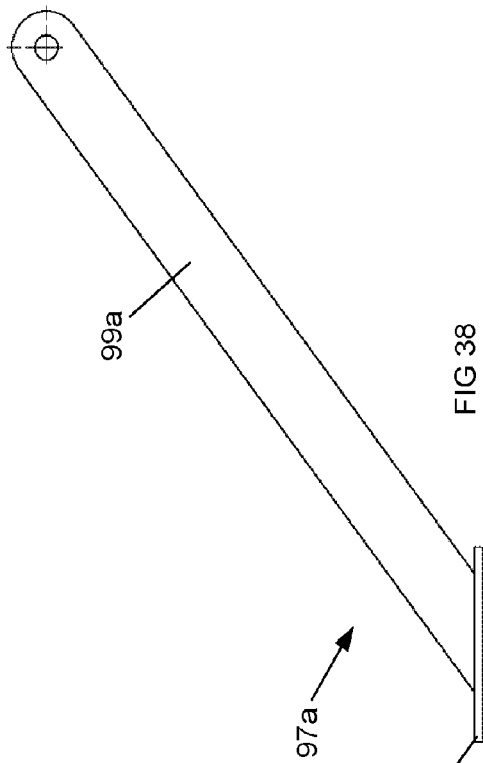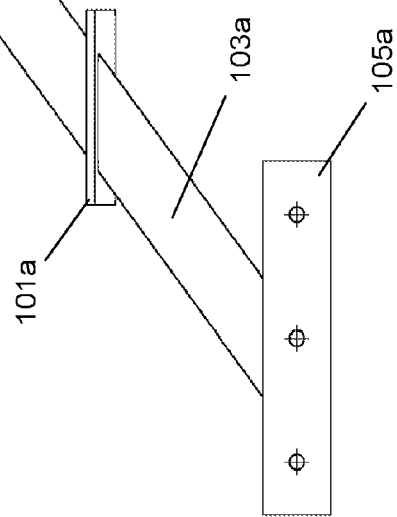

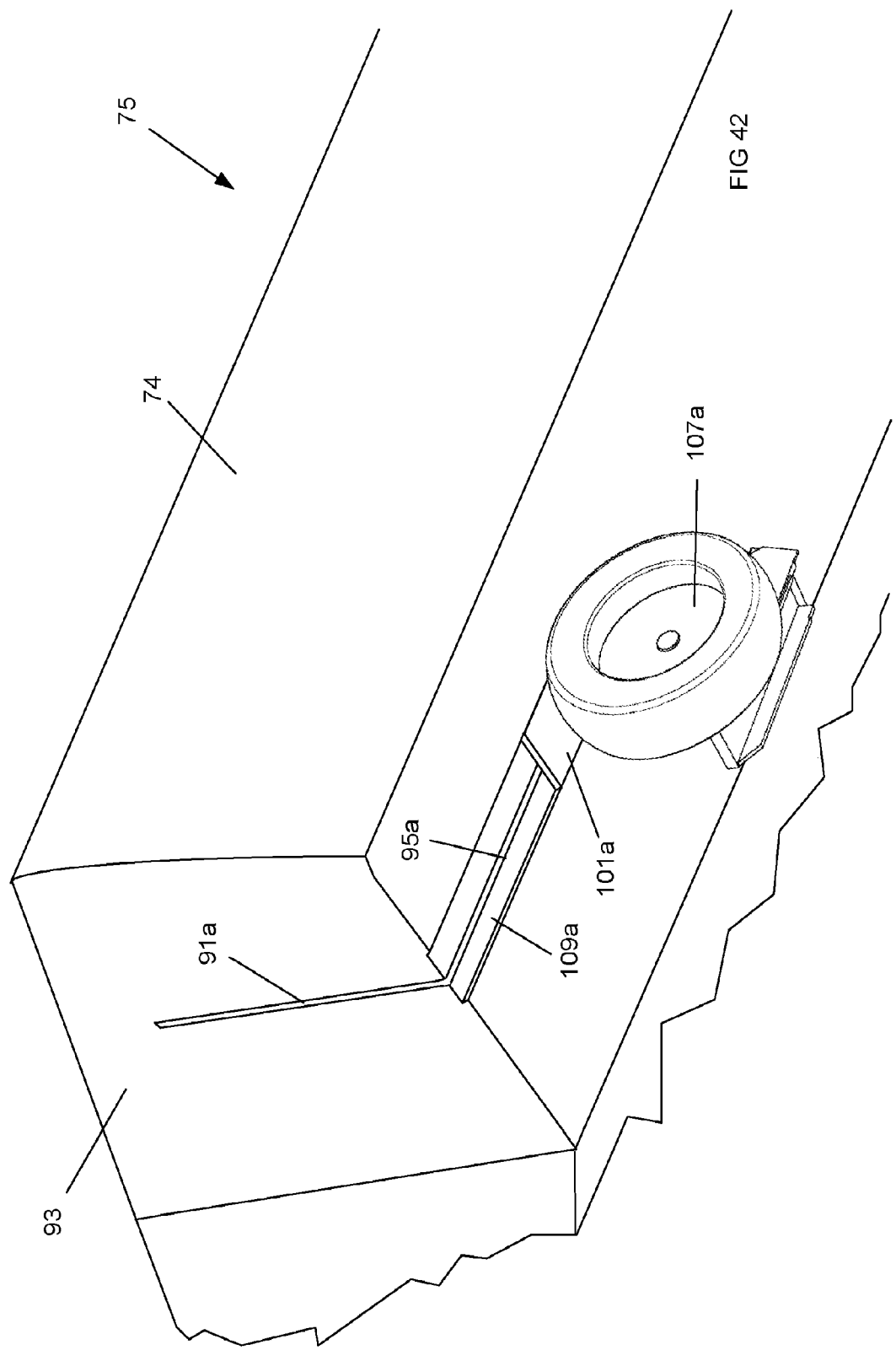

BOAT WITH RETRACTABLE WHEELS

TECHNICAL FIELD

The present invention is directed to a boat having attached wheels which can be moved between an extended "land" position whereby the boat can be maneuvered on land and a retracted "water" position where the boat can be used on water. The invention is particularly directed to attaining an improved position of the wheels in the land position for towing by a vehicle and in the case of smaller boats, for maneuvering on land by hand. The improved position of the wheels also allows for broader application to boats where the wheels are powered, and the boat therefore can self-drive. By moving the back wheels further forward, and the front wheel further back, the span between the wheels is reduced enabling application to longer boats.

BACKGROUND

Any references to methods, apparatus or documents of the prior art are not to be taken as constituting any evidence or admission that they formed, or form part of the common general knowledge.

Many boats are transported to and from water via a towed boat trailer. There are disadvantages with this arrangement including the cost of the trailer and loading and unloading the boat. The trailers are not suited for soft sand or uneven surfaces. Furthermore, a considerable amount of physical strength may be required to load and unload the boat onto and from the trailer so that for some people there may be a barrier to using the boat.

It is known to provide boats with attached wheels. One simple arrangement comprises separate wheels that are clamped onto the boat when required and removed when not required. A disadvantage with this arrangement is in the time required to attach and detach the wheels and the risk that the wheels may become dislodged when the boat is maneuvered on land.

Another arrangement has the wheels permanently attached to the boat and able to be moved between a lowered land position and a raised water position. These wheels, when in the lowered land position, generally extend from behind the boat (rear of the transom) or generally below the transom.

A disadvantage with this arrangement is that most, if not all, of the boat's weight will be forward of the wheels and this can make lifting of the boat from the front difficult. If a front wheel is used, the load on this wheel can be excessive making it more difficult to maneuver the boat across sand or other soft ground as the front wheel will dig in.

There would be an advantage if the wheels could enable towing of the boat without the requirement of a boat trailer. However, in most jurisdictions there are regulations regarding towing weights of unbraked wheels. The maximum unbraked towing weight is about 750 kg. Thus heavy wheel designs can cause even smallish boats to exceed the unbraked load limit requiring the wheels to have brakes.

Furthermore car manufacturers place restrictions on the tow hitch vertical weight and the weight limit for most cars is 100 kg. This can be exceeded if most of the boat weight is supported forward of the rear wheels so that even small boats cannot be legally towed.

Many known boats with retractable wheels have powered wheels to allow the boat to be driven onto land. While powered wheels may assist in maneuvering the boat on land, the design is complex, expensive and heavy, making this arrangement less suited to smaller boats.

Another problem with existing retractable wheels on boats is that most of the weight of the wheel assembly—due to the wheels, the hydraulic rams or other lifting and lowering devices and the housings—sits outwardly from the transom or close to the transom resulting in a large amount of weight being at the rear of the boat. Having the weight proximal the housing can reduce the boat's performance and can cause "hobby horsing". Hobby horsing, i.e. pitching of a boat through large angles, is disruptive to sail boats as the motion disrupts the flow of air over the sails and can be uncomfortable to passengers. Similarly in power boat applications, hobby horsing resulting from poor weight distribution can result in a less comfortable ride, and reduce the seaworthiness of the vessel. This can be overcome by redesigning the boat hull but this makes such retractable wheels less suited to an aftermarket fitment to a conventional boat.

Another problem with existing retractable wheels on boats is that the working parts (the lifting and lowering mechanism) may be in contact with saltwater and are therefore prone to corrosion.

Another problem with existing retractable wheels is that the wheels and mechanism can extend from sides of the boat making the wheels susceptible to damage, for instance when mooring.

Another problem with existing retractable wheels is in raising and lowering them. In the case of small dinghies, this is usually accomplished by the operator reaching their hand over the transom of the boat, grabbing the wheel, uncoupling it, lowering it beneath the water into position, and recoupling it. In cases of boats with motors, this involves placing hands underwater in a position next to the propeller. Not only can this be dangerous, but it is also awkward, and requires a certain level of strength and agility that may make it unachievable for certain people.

It is an object of the invention to provide retractable wheels for a boat which could overcome one or more of the abovementioned disadvantages or provide a useful or commercial choice in the marketplace.

SUMMARY OF THE INVENTION

According to a first aspect of the invention there is provided a watercraft with retractable wheels, the watercraft having a hull, a slot extending through the hull, and an arm member supporting a wheel, the arm member extending through the slot and being pivotable between a wheel retracted position and a wheel extended position.

Suitably, the watercraft has a pair of spaced apart slots extending adjacent a rear portion of the watercraft, each slot adapted to accommodate a said arm member to accommodate a pair of retractable rear wheels.

Suitably, the watercraft has a front slot to accommodate a retractable front wheel.

In a more particular form there is provided a watercraft with retractable wheels, the watercraft having a hull, a slot extending through the hull, a housing sealingly engaged about the slot to prevent water from entering into the watercraft, and an arm member pivotally attached relative to the housing and supporting a ground wheel, the arm member extending through the slot and being pivotable between a wheel retracted position and a wheel extended position.

The watercraft may be provided with at least one front retractable wheel and at least two rear retractable wheels with each retractable wheel having an arm member.

A non-limiting example of the arm member for the rear wheels in the wheel retracted "up" position is illustrated in FIG. 4 and a non-limiting example of the arm member in the wheel extended 'down" position is illustrated in FIG. 3.

Suitably, the slot for a said rear wheel comprises an L shaped slot defining two slot portions, a first slot portion extending through the hull and a second slot portion extending through a transom.

Suitably, the arm member is pivotable between the wheel retracted position wherein the arm member extends through the second slot portion in the transom and the wheel extended position where the arm member extends through the first slot portion in the hull.

The watercraft will suitably be provided with two rear wheel slot and housing arrangements, one adjacent each side of the watercraft to allow two spaced rear wheels to be provided. FIGS. 3-4 illustrate a non-limiting embodiment of a suitable position of the two L shaped slots each able to support a wheel.

However it is also envisaged that a single rear slot arrangement may also be suitable with the arm supporting a pair of spaced wheels. A non-limiting example of this embodiment is illustrated in FIG. 5. This arrangement may not be suitable if the watercraft has an outboard motor, but may be suited for sail boats or where the wheels can be free from any motor. In the embodiment of FIG. 5 a single L-shaped slot 40 passes through the hull 11 and the arm member 41 is of a design to support a pair of spaced apart wheels 42, 43. In a variation, the L-shaped slot 40 may be more centrally located. This arrangement has the advantage of only a single L-shaped slot passing through the hull but has a disadvantage that the wheels may interfere with an outboard motor. However, the arrangement of this embodiment might be suited for non-motorised sailing vehicles and the like.

The particular design provides many advantages. One advantage is that when the wheels are in the extended position (see FIG. 3 at least), the wheels are substantially under the boat and can support much more of the boat weight than is the case with wheels on the rear edge (transom) of the boat. This places less weight on the front of the boat and can therefore place less load on a front wheel (if fitted), may make the boat suitable for towing without requiring braked wheels and may fall within the vehicle manufacturers specifications regarding the vertical weight limit on a tow ball. Braked wheels can however be used for larger boats having the retractable wheels.

Another advantage is that a good part of the weight of the wheel assembly—the housing and part of the arm member— is inside the boat and somewhat away from the transom which reduces the weight load at the rear of the boat and can reduce hobby horsing.

Another advantage is that many of the working parts of the assembly—the pivot pin and arm member are not in contact with salt water or salt spray and corrosion is reduced.

The watercraft may comprise any suitable type of boat. This may include sailing boats, a power boat with an outboard motor, a power boat with an on-board motor, small aluminium boats, larger size commercial boats, rigid inflatable boats (RIB) and the like. It is envisaged that the boat will not be exceedingly large and will be of the type that can benefit from the retractable wheels the subject of the present invention. It is envisaged that a suitable boat may have a length of between 3-12 m and a weight of between 100-10, 000 kg. The very small lightweight boats can probably be lifted manually and therefore will benefit less from use of the wheels which are the subject of the present invention.

Conversely, much larger and heavy boats may require large powered wheels and hydraulics and may also benefit less from the wheels or tracks which are the subject of the present invention.

As an embodiment of the invention may have the watercraft able to be towed by a vehicle, and as there is a benefit in having unbraked wheels as the retractable wheels on the watercraft, it is envisaged that a particularly suitable type of watercraft will be a boat having a total weight (including wheels) of 750 kg or less or falling within the regulations set by the local authority regarding the maximum towable load using unbraked wheels. However, it is also envisaged that the retractable wheels can be braked wheels making this arrangement suited for larger and heavier boats.

The watercraft is suitably provided with a generally L shaped slot defining two slot portions with one of the slot portions (the first slot portion) extending through the hull of the watercraft, and the other slot portion (the second slot portion) extending through the transom. The slot portions allow the arm member (containing the wheel) to pivot along the slots between the retracted and the extended position. The length of each slot portion can vary. It is envisaged that the length of the first slot portion will be between 300-600 mm and a length of the second slot portion will be between 200-400 mm. The length of each slot portion enables the arm to pivot through a particular arc and generally the longer the slot the more the arm is able to pivot before the arm strikes a slot end. However, the configuration of the arm can also assist in the pivot arc. The width of each slot portion can also vary but it is envisaged that a width of between 20-50 mm will be sufficient to enable the arm member to extend through the slot. Each slot will typically be generally rectangular or possibly somewhat oval.

A generally L shaped slot will be provided for each rear retractable wheel that is attached to the watercraft. As it is envisaged that it will be most common for the watercraft to have a pair of rear wheels, it is envisaged that a pair of L-shaped slots will be provided. These may be spaced apart and adjacent each side of the watercraft.

To prevent water from passing into the watercraft through the slots, a housing is provided which is sealingly engaged about the slot to prevent water from leaking into the watercraft. The housing may be made from any suitable material and it is envisaged that the housing will be made of metal such as aluminium or stainless steel. However, other materials may be suited such as reinforced fibreglass, engineering plastics and the like.

If the slot is L shaped, the housing will typically be substantially C shaped or U-shaped to define an open bottom and one open side. The open bottom and the one open side can sealingly engage about the L-shaped slot. The type of sealing engagement may vary. For instance, if the housing is made of aluminium, and the hull/transom is similarly made of aluminium, the housing may be welded to the hull/ transom. Alternatively, the housing may be bolted or otherwise fastened into position. A sealant may be provided. A gasket may be provided. Adhesive may be used to attach the housing.

The housing may be made from a single piece of material or may be made from separate pieces attached together. The size of the housing is preferably such that the top of the housing will be above the waterline.

An arm member is provided. One end of the arm member supports at least one ground wheel or one end area of the arm member supports a ground wheel. The ground wheel may be attached by any suitable means. One suitable means may include a short stub axle attached to a lower end of the arm member and to which the wheel is attached. Other types of attachments are envisaged as well.

The arm member may be made of any suitable material. It is considered that a suitable material for the arm member will be metal and particularly tubular metal such as box section or round section. Corrosion resistant material is preferred and therefore a preferred metal will be aluminium or stainless steel. However, the arm member may also be formed from solid material such as plastics, fibreglass, wood and the like.

The arm member is pivotly attached to the housing. The length of the arm member between the pivot and the attached wheel can vary inter alia on the configuration and shape of the boat. It is envisaged that the arm member will have a length of between 45-150 cm. A longer arm member can provide a longer sweep arc of the wheel and advantages of this will be described in greater detail below.

The arm member will typically comprise a single piece for rigidity and strength. However, there may be circumstances where the arm member is made of smaller pieces that are attached together. For instance, having segmented arm members may make it easier to adjust the length of the arm member to suit the particular watercraft. The segmented arm members may be screwed fitted together, bolted together, welded together and the like.

A handle is suitably attached to the arm member to enable the arm member to pivot between its retracted an extended position. The handle suitably extends from the other side of the pivot. The handle may be removable from the arm member or may be permanently attached to the arm member. The handle may be length adjustable. The handle may be formed from any suitable material and a preferred material will be corrosion resistant materials such as aluminium, stainless steel, some type of plastics, fibreglass, wood and the like.

It is envisaged that the arm member can also be moved between its retracted and its extended positions using a powered system instead of a manual handle. The powered system may include an electrically powered system. A hydraulic ram may be used to extend and retract the arm member. It is also envisaged that the arm member can be moved either manually or using a powered system. A gear system with a crank handle may be used to move the arm member.

An abutment member may extend out from the arm member for abutting an underside of the watercraft in the wheel extended position to thereby support the watercraft whilst travelling on land.

The arm member may comprise a first portion comprised of a plate pivotally attached the housing and a second portion having a greater width than the first member for load bearing.

Preferably the abutment member extends outwardly from adjacent a junction of the first portion and the second portion.

In a preferred embodiment of the invention the abutment member is slanted relative to the first portion of the arm member.

Preferably the hull is formed with a recess for receiving the abutment member in the wheel extended position to thereby locate the abutment member in a load carrying position against the hull of the watercraft.

In at least one embodiment of the invention the housing comprises first and second spaced apart plates receiving the first portion of the arm member therebetween wherein the abutment member and the second portion of the arm member are positioned outside the hull.

Preferably a stub axle assembly is provided to which a ground contact wheel is fastened, the stub axle assembly may be fastened to the distal end of the second portion of the arm member.

In some embodiments the watercraft includes a metal frame disposed within the hull, the frame including a leading member protruding through a forward portion of the hull for attachment of a towing arrangement thereto.

The wheel for ground contact will typically comprise a wheel suitable for immersion in saltwater and this type of wheel arrangement is known. The wheel is suitably a pneumatic wheel. It is envisaged that the wheel can be replaced with other types of wheels or rollers depending on the choice of the boat owner. For instance, the wheel may comprise a much larger "balloon" wheel for use over soft surfaces such as beaches.

It is envisaged that for most instances, the wheel will be a simple unbraked wheel. However, the present invention also envisages use of a braked wheel and the braking mechanism will typically comprise a known arrangement used for braked wheels on boat trailers.

The vessel suitably includes a retractable front wheel. The front wheel may be connected to an arm member which extends through a slot in the hull of the boat in a forward position of the boat. A front housing may be provided to seal around the slot in a manner similar to that described above.

The present invention can be applied to a number of different boat applications. For instance, the boat may be provided with rear wheels only. This type of arrangement may be suitable for small dingy style boats where the front of the boat can be quite easily manually lifted. The boat may also be provided with rear wheels and a front wheel. This type of arrangement may be suitable for larger boats where it may be difficult to manually lift the front of the boat. The rear wheels may be braked wheels or unbraked wheels. The front wheel may comprise a jockey type wheel or a pivoting wheel as described in the present invention. It is also envisaged that the boat may be provided with a towing hitch together with the rear wheels to enable the boat to be towed by a car or other leading vehicle. It is also envisaged that the wheels (and particularly the rear wheels) may be self-drive wheels to give the watercraft a self-driving capability. In this arrangement, a towing hitch may again be provided.

According to another aspect of the present invention there is provided a retractable wheel assembly for a boat, the assembly comprising:

a wheel, an arm member having an outer end and an inner end, the wheel being rotatably attached to the outer end of the arm member, a housing which has an open bottom, a pair of opposed sidewalls, one end of the sidewalls being interconnected by an end wall, the other end of the sidewalls being open, a pivot in the housing, the inner end of the arm member being pivotally attached to the pivot, the arm member being pivotable between a wheel retracted position wherein the arm member extends through the other open end of the sidewalls and a wheel extended position where the arm member extends through the open bottom of the housing, the housing adapted to be positioned in a boat with the open bottom sealable about an open slot in the boat hull and the open end of the sidewall sealable about an open slot in the transom.

In yet another aspect, there is provided a retractable wheel assembly for a watercraft such as a boat or amphibious aircraft or the like, the assembly comprising:

a wheel, an arm member having an outer end and an inner end, the wheel being rotatably attached to the outer end of the arm member, a housing which has an open bottom, a pair of opposed sidewalls, one end of the sidewalls being interconnected by an end wall, the other end of the sidewalls being open, a pivot in the housing, the inner end of the arm member being pivotally attached to the pivot, the arm member being pivotable between a wheel retracted position wherein the arm member extends through the other open end of the sidewalls and a wheel extended position where the arm member extends through the open bottom of the housing, the housing adapted to be positioned relative to the amphibious aircraft with the open bottom sealable about an open slot in the aircraft body or a float assembly of the aircraft and the open end of the sidewall sealable about an open slot provided in a float assembly of the aircraft.

In another aspect, the invention also provides an amphibious aircraft comprising the retractable wheel assembly described herein.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIGS. 24 to 29 Illustrate dual wheel versions of a watercraft according to an embodiment of the present invention.

FIGS. 38 to 41 are views of an arm member of the boat of FIG. 32.

FIG. 42 is a view of the underside of the right hand side of the boat of FIG. 32 with the right hand side wheel shown in an extended, ground contact position.

DETAILED DESCRIPTION OF PREFERRED EMBODIMENTS

The figures illustrate various embodiments of the invention. As will be seen, the primary differences between the various embodiments lie in the arc of travel of the wheels, or the particular design of the wheel assembly, and the means to operate the one or more arm members which control the extending and retracting of the wheels.

Figure 1:
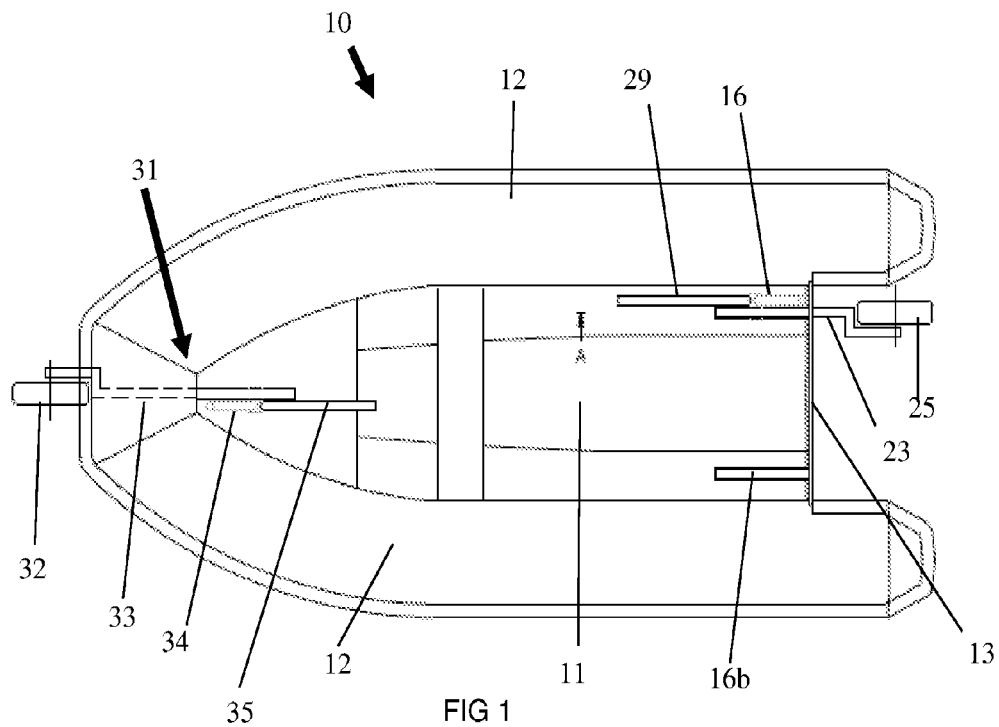
FIG. 1. Illustrates a plan view of a watercraft in the form of a boat with retractable wheels in the retracted position.
Figure 2:
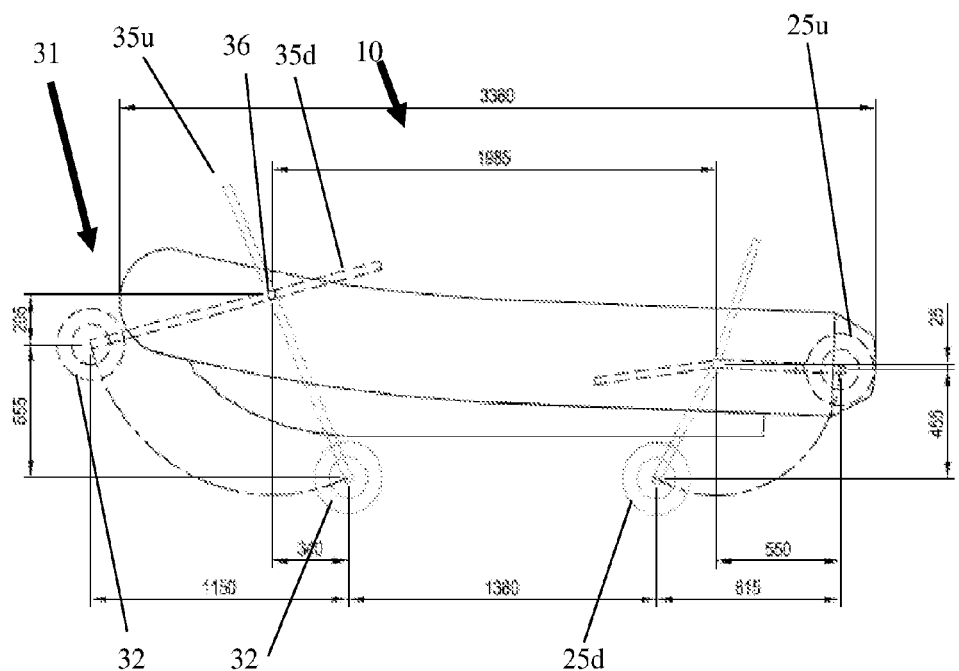
FIG. 2. Illustrates a side elevation view of the boat of FIG. 1 with the wheels in the retracted position and showing the wheels in the extended position.

Referring initially to FIGS. 1 and 2, there is illustrated a watercraft which, in the particular embodiment, comprises a rigid inflatable boat (RIB) 10. These boats are lightweight and have a good performance and capacity and comprise a solid shaped hull 11 and two flexible tubes 12 at the gunwale. These boats also have a solid transom 13. Of course, although the particular embodiment is directed to a rigid inflatable boat, it is envisaged that the present invention is applicable to other types of boats as well.

Figure 3:
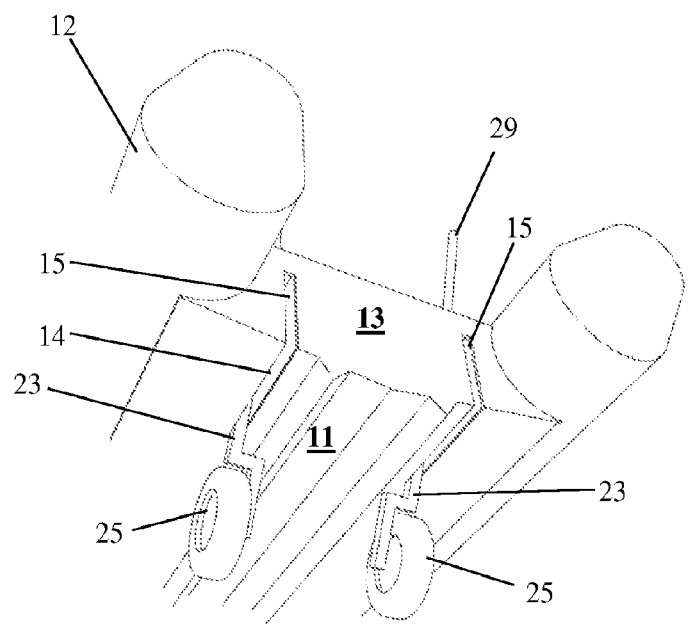
FIG. 3. Illustrates a rear part of the boat with the wheels in the extended position.
Figure 4:
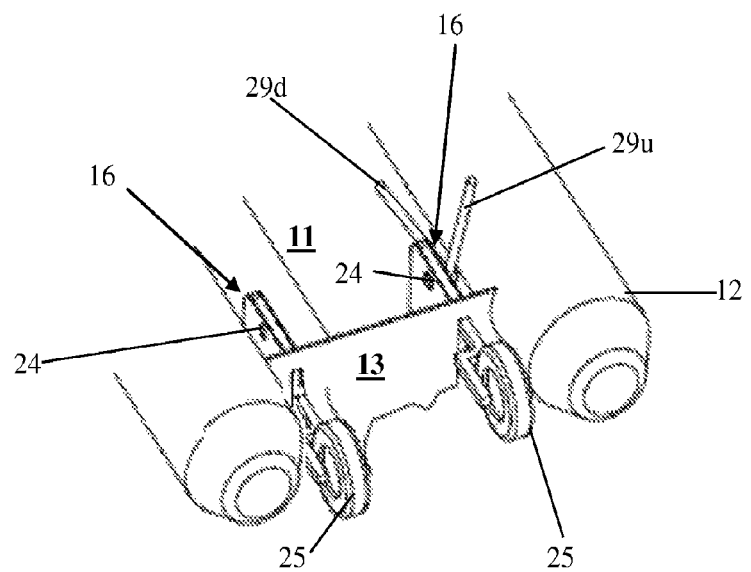
FIG. 4. Illustrates a rear part of the boat with the wheels in the retracted position.

FIGS. 3 and 4 are views of the rear of boat 10. It will be observed that a substantially L-shaped slot is formed in the hull and the transom comprised of first and second slot portions being a first slot portion 14 extending through the hull and a second slot portion 15 extending through the transom 13.

Figure 5:
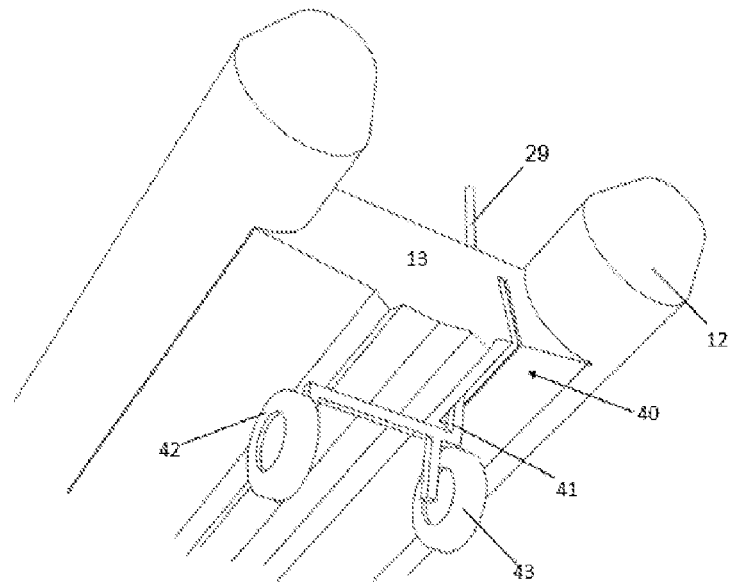
FIG. 5. Illustrates an embodiment of the invention where a pair of wheels is operated by a single operating mechanism.

The particular embodiment as illustrated in FIGS. 1-4 illustrate a pair of L-shaped slots formed in the hull adjacent the area between the hull/transom and the tubes 12. However, it should be noted that a further embodiment illustrated in FIG. 5 only requires a single L-shaped slot.

In the presently described embodiment of the invention, the first slot portion 14 and a second slot portion 15 have the same width which is approximately 20-50 mm and should be wide enough to allow the arm member (described below) to pass through the slot. However, it is undesirable for the slot to be too wide as this can reduce the available use of the interior of the boat.

The first slot portion 14 is longer than the second slot portion 15. The length of the first slot portion can vary depending on the desirable arc of travel of the arm member (this will be described in greater detail below) and in most instances, the length of the slot will be between 300-1200 mm. The length of the second slot portion need not have a similar degree of variance as the length of the slot is sufficient to allow the wheel to be lifted out of the water and a length of between 200-600 mm will be suitable.

Figure 6:
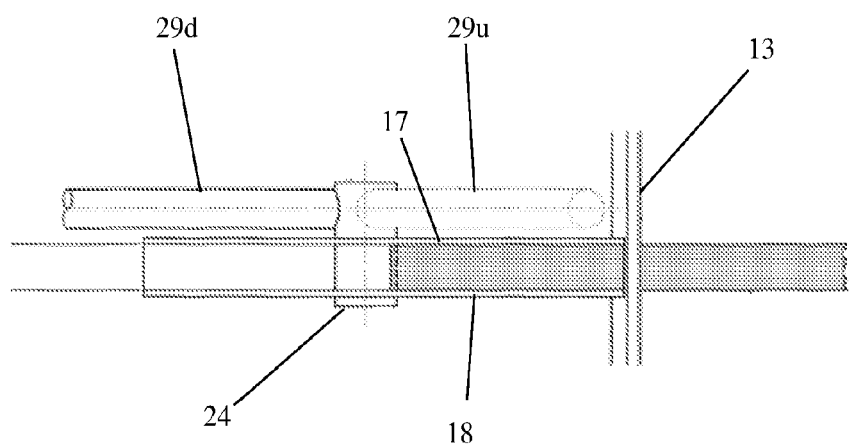
FIG. 6. Illustrates a plan view of the housing.
Figure 7:
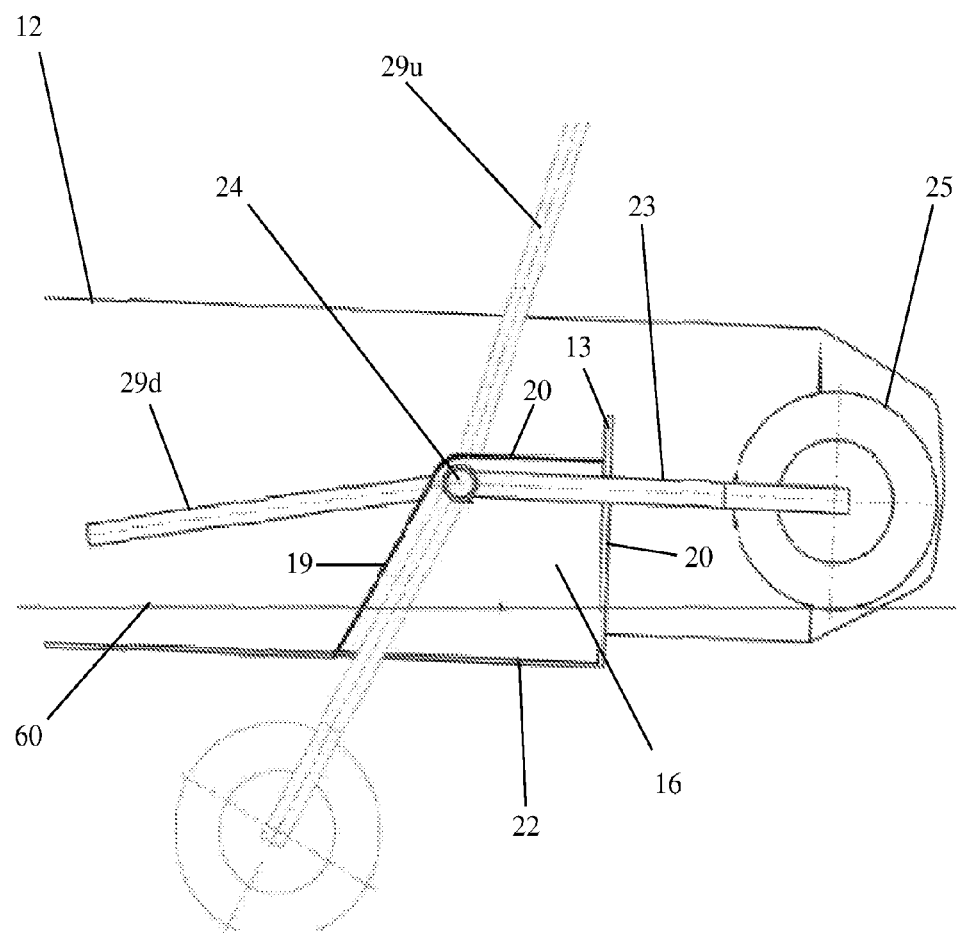
FIG. 7. Illustrates a side view of the housing.
Figure 8:
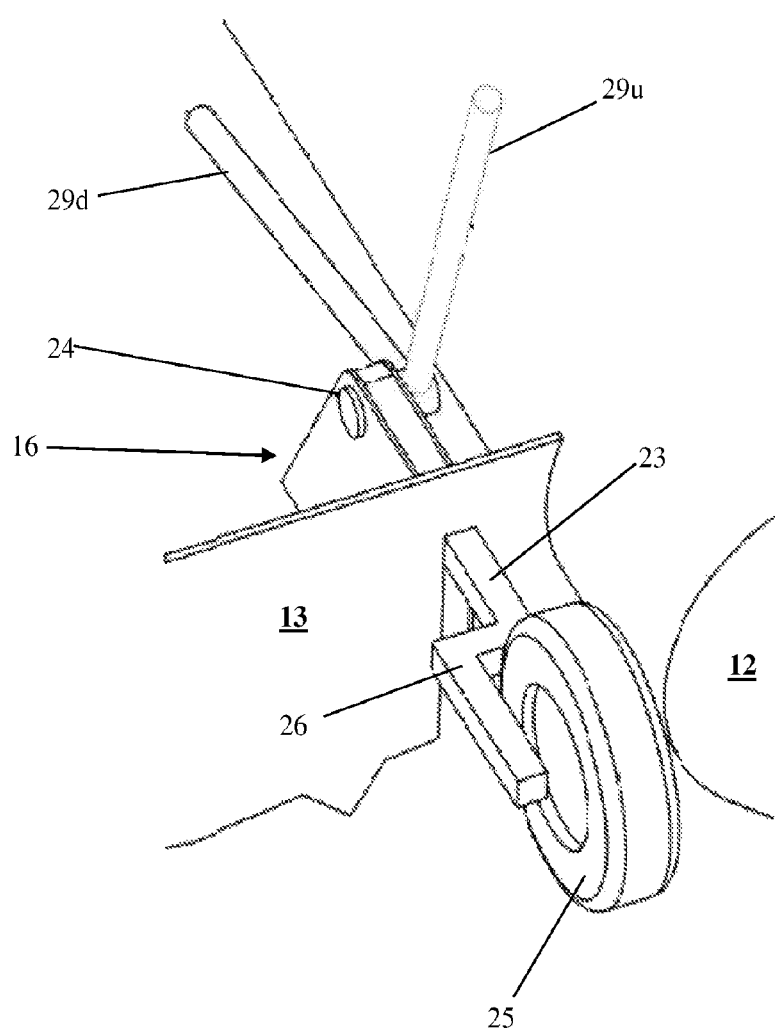
FIG. 8. illustrates a rear perspective view of the housing.

To prevent water passing into the boat through the L-shaped slot, a housing 16 is provided. Housing 16 is illustrated in FIG. 4 and variations of the housing will be described with reference to other figures. FIGS. 6, 7 and 8 also illustrate housing 16. Housing 16 seals about the L-shaped slot and therefore seals about the first slot portion 14 extending through the bottom of the hull and the second slot portion 15 extending through a lower part of the transom 13. To achieve this, Housing 16 has a pair of opposed sidewalls 17, 18 (see FIG. 6), a closed end wall 19, an open opposite end 20, an open or closed top 21, and an open bottom 22. The open bottom 22 seals about the first slot portion 14 extending through the hull and the open end 20 seals about the substantially vertical second slot portion 15 extending through the transom.

If the hull and the transom are formed from aluminium, the housing 16 can also be formed from aluminium and can be welded in position. Alternatively, the housing can be attached by fasteners and sealed using sealant, gaskets and the like.

Water will flow through the slot portions 14, 15 and into housing 16 and the design of housing 16 is such that the height of the sidewalls 17, 18 is higher than the water level 60 (see at least FIG. 7) outside the boat. Thus, water can never overflow through top 21 of housing 16 if the top is open. Additionally, the height of sidewalls 17, 18 is designed to keep the hinge mechanism or pivot mechanism (which will be described in greater detail below) above the waterline 60 which can reduce corrosion of these components.

Inwardly directing rubber or plastic sealing lips (not illustrated) can be attached over open top 21 to prevent fingers from entering into this area or items being accidentally dropped through the open topped 21 of the housing. The sealing lips will still enable the arm member to operate if the arm member extends through the open top. Of course, the top need not be open.

An arm member 23 is provided which extends from a pivot 24 to where a ground wheel 25 is attached to the arm member. Arm member 23 will typically be formed from tubular metal such as round tube or square tube to give it strength and rigidity. The length of the arm member will, inter alia, determine the sweep arc of the arm about the pivot 24. In different embodiments, the length of the arm member is different. In the embodiment illustrated at least in FIGS. 3-4, the arm member will have a length of about 550 mm. In other embodiments, the arm member can be longer.

Arm member 23 supports ground wheel 25 for rotation of the ground wheel. The lower end of the arm member 23 has a stepped in portion 26 (see for instance FIG. 8) and wheel 25 is rotatably mounted via a stub axle to the stepped in portion. The wheel 25 is a pneumatic wheel and has a hub design suitable for immersion in seawater this type of arrangement being known and used on boat trailers and the like. In the embodiment illustrated at least in FIGS. 3-4 and 7-8, the wheel is a non-braked wheel but it should be appreciated that in other embodiments the wheel may comprise a braked wheel making it suitable for transporting heavier loads.

As previously alluded to, the embodiment of FIG. 1, comprises a rigid inflatable boat 10 having a rigid hull 11 and inflatable tubes 12. The plan view of FIG. 1 illustrates a pair of housings 16A, 16B sealingly engaged about a pair of spaced apart first slot portions extending through the hull (the slot portions not illustrated in FIG. 1). The housings 16A, 16B, are spaced inwardly from the transom 13 and are adjacent each side of the hull. This provides sufficient space for an outboard motor to be positioned centrally on the transom. Housing 16A is illustrated with an attached handle 29 on arm member 23 while housing 16B does not show the arm member 23 since it is also envisaged that the arm member can be removed when not required, such that, if the retractable assembly is not required, everything except the housing can be removed and stored. FIG. 1 housing 16b illustrates this variation where only the housing 16b remains on the boat.

Arm member 23 is able to pivot or hinge about pivot 24 between a retracted position (an example of which is illustrated at least in FIG. 4) and an extended position (an example of which is illustrated at least in FIG. 3). In the retracted (water) position, the wheels 25 are extended to be generally above the waterline and, in the preferred embodiment, extending generally behind the transom 13. In the extended (land) position the wheels 25 extend underneath the hull 11 of the boat. Specifically, when in the extended position, the arm member 23 extends through the first slot portion 14. As the wheels are retracted to the position illustrated in FIG. 4, the arm member 23 rotates through an arc along the first slot portion 14 and into the second slot portion 15 until the wheel is fully retracted (see for instance FIG. 4) where the arm member is generally against the upper part of the second slot portion 15.

Handle 29 is provided to assist in moving the arm member/wheel between the retracted and extended positions. Handle 29 in the embodiment illustrated at least in FIGS. 3 and 4 (and other figures as well) comprises a general extension of the arm member and therefore comprises a tubular or box section metal handle. Handle 29 can be permanently attached to the end of the arm member 23 although it is more preferred that the handle 29 can be removed. Handle 29 can be screwed threaded to the end of the arm member 23. Alternatively, the handle can be attached using a twist lock mechanism. Alternatively, the handle may be attached using fasteners such as pin in slot fastening or nuts and bolts fastening. The length of the handle may vary but the handle should be long enough to enable the enough lever action to be available to allow the arm member and the wheel to pivot between the extended and retracted position. It is considered that a handle length of between 400-1000 mm will be suited.

FIG. 2 also illustrates the two positions of the rear wheel being the "up" position 25u and the "down" position 25d.

FIG. 2 illustrates one of the advantages of the invention which is that when the rear wheels (only one wheel visible in the side view of FIG. 2) are in the extended "land" position, the wheels extend significantly underneath the boat this being because of the design of the arm member and the housing and the location of the slot portions. In this position, the wheel can support a substantial amount of the weight of the rear portion of the boat which is in contrast with conventional wheel arrangements where the wheels are behind the transom 13 or substantially directly underneath the transom 13 which means that most of the weight of the boat sits forwardly of the wheels. In contrast, with the present invention, a significant amount of weight of the boat is balanced on the wheels or sits behind the wheels. This transfers weight from the front wheel of the boat or the front part of the boat to the rear wheels which makes the boat easier to lift from the front, places less load on the front wheel (if fitted) and enables larger boats to be towed by a car or other vehicle without exceeding weight specification.

If a front wheel is fitted (see for instance FIG. 2 and FIG. 13), a similar arrangement is present where the front wheel sits substantially underneath the boat when in the extended position.

As illustrated in FIGS. 1 and 2, embodiments of the invention comprise a front wheel assembly 31 which can also pivot between an extended and retracted position. The assembly is similar to that described above and therefore comprises one of two (see FIG. 19 for the two wheel version) front wheels 32 a front arm member 33 a front housing 34 and a handle 35, the arm member 33 being attached to housing 34 via pivot pin 36 which is illustrated in FIG. 2. A slot 37 (see FIG. 18) extends through a forward portion of the hull and is sealed by housing 34 to prevent water entering into the boat. The slot is not necessarily L-shaped and may only comprise a single slot extending through the forward portion of the hull which means that the housing 34 will have an open bottom to engage about the slot and will have opposed sidewalls and an opposed end walls. FIG. 2 at least illustrates the two positions of the front wheel assembly being an upper retracted position (water position) and a lower extending position (land position). In some embodiments, a steering mechanism that includes a rotary actuator may be provided. The rotary actuator (not shown) may be in the form of an electrical actuator or a hydraulic actuator. A drive unit such as an electrical drive unit (not shown) may also be used for driving the front wheels 32. Similarly, the drive unit may also be used for driving one or more of the rear wheels 25.

Figure 9:
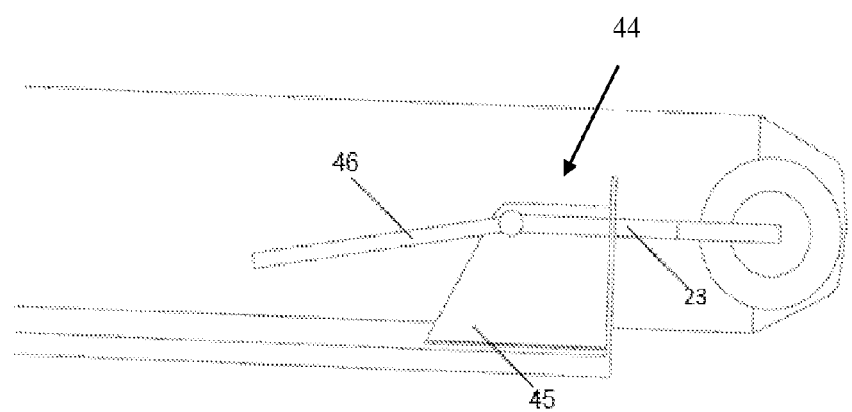
FIGS. 9-10. Illustrate the large swing arc of the wheels.

FIG. 9 illustrates an embodiment where housing 44 is a slightly different design in that the closed end wall 45 of the housing is sloped to allow the handle 46 to move through a greater arc without interfering with the housing walls. The handle 46 in these embodiments (and other embodiments) may be to one side of the sidewalls of the housing, while in other embodiments, the handle may have its lower end between the sidewalls of the housing and extending through the open top.

If the handle extends through a side wall of the housing, then the open top of the housing can be substantially closed or entirely closed off.

The housing 16, 44 sits inside the boat which reduces weight at the transom, which can reduce hobby horsing.

The pivot pin area is in an upper part of the housing and above the water line in the housing which reduces corrosion on these "working" parts of the mechanism.

Figure 10:
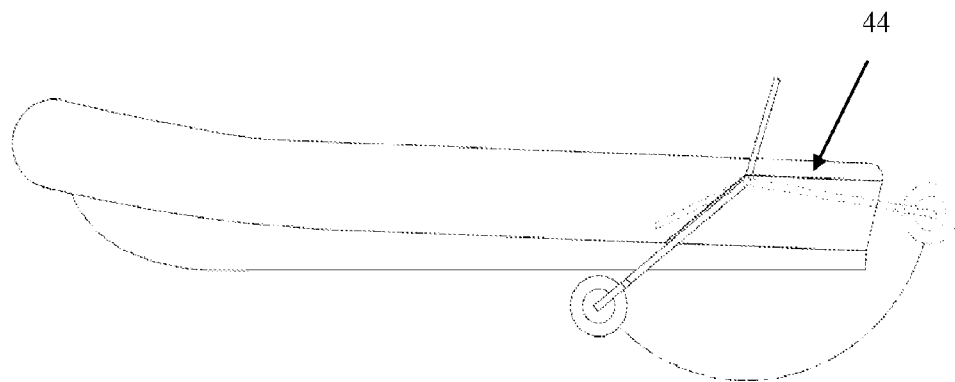

Yet a further embodiment of the invention is illustrated in FIG. 10 wherein the housing 44 is somewhat longer so that it can extend to the transom which is located at the very rear of the watercraft illustrated in this figure.

Figure 11:
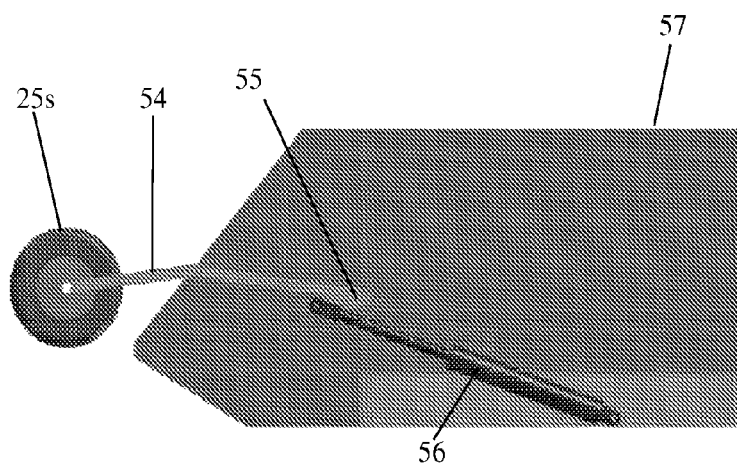
FIGS. 11-13. Illustrate a rear wheel in the stowed position, self-drive position and the towing position respectively.
Figure 12:
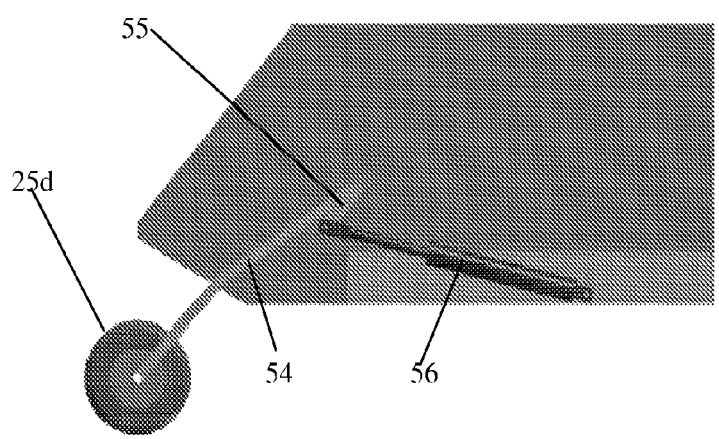
Figure 13:
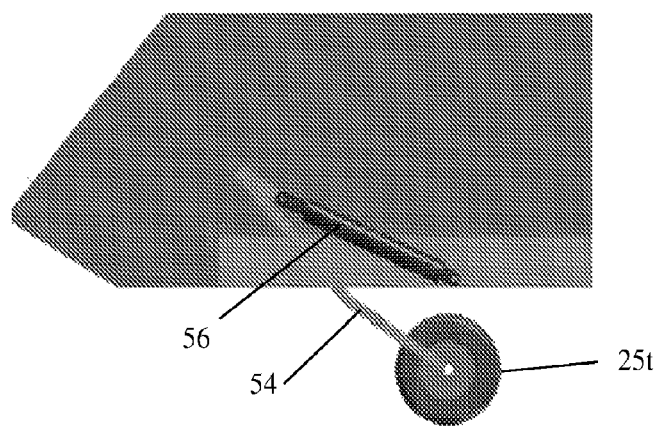

Referring now to FIGS. 11-13 there is illustrated an embodiment of the invention where the rear wheels can be extended and retracted using a hydraulic ram 56 and where the rear wheels can also be positioned in an intermediate position (the self-drive position illustrated in FIG. 12). FIGS. 11-13 illustrate a single rear wheel but it should be appreciated that a second wheel and a second ram 56 will be located adjacent the other side of the boat 57. Wheel 25 can be locked or located in three distinct positions being a stowed position 25s (FIG. 11), a self-drive position 25d (FIG. 12) and a towing position 25t (FIG. 13). The wheel is moved between its positions by extension and retraction of hydraulic ram 56. The locking of the hydraulic ram in any particular position will lock the wheel in that particular position. Hydraulic ram 56 is connected to a small connecting strut 55, which is connected to arm member 54. The wheel 25 is connected to arm member.

Figure 14:
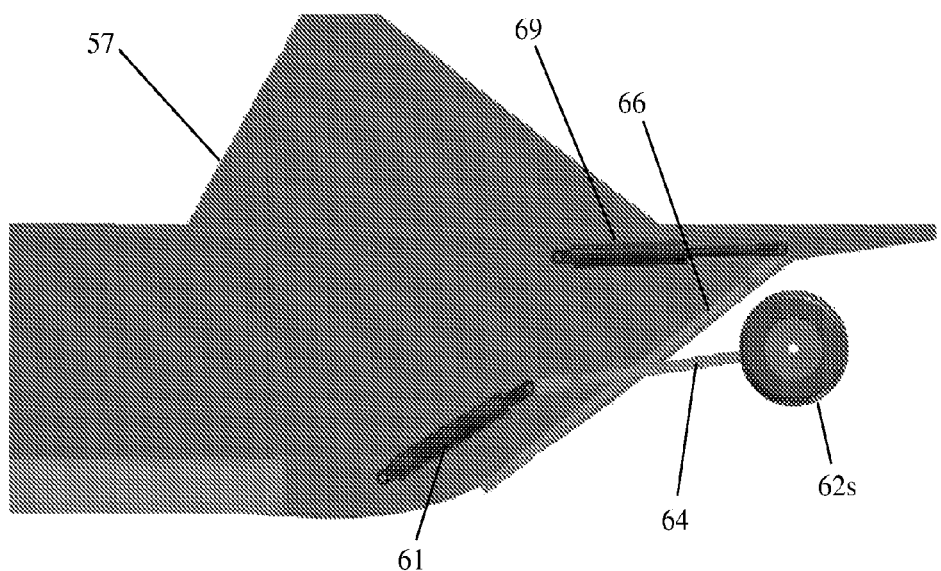
FIGS. 14-16. Illustrate the front wheel in the stowed position, self-drive position and the towing position respectively.
Figure 15:
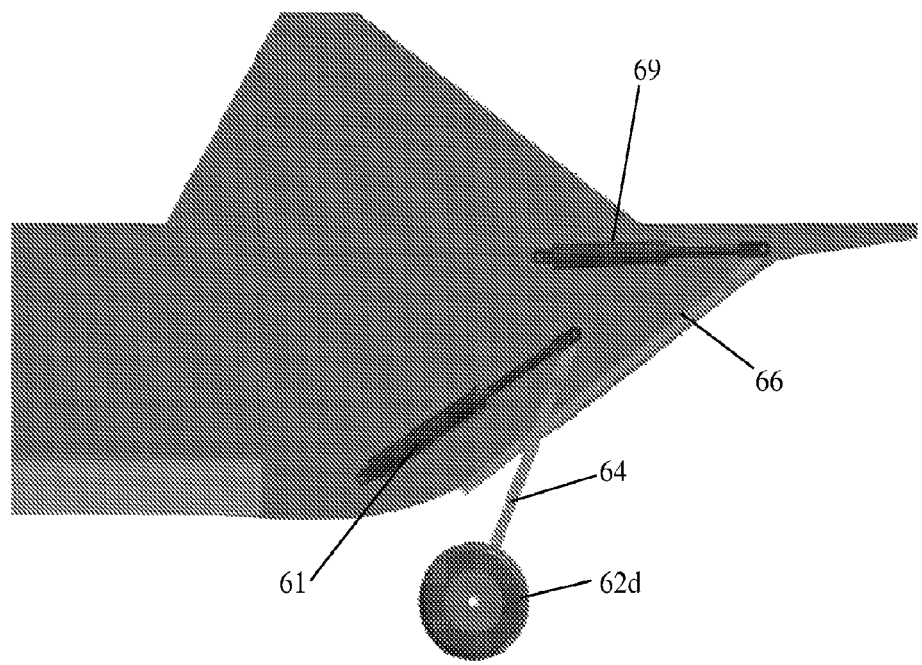
Figure 16:
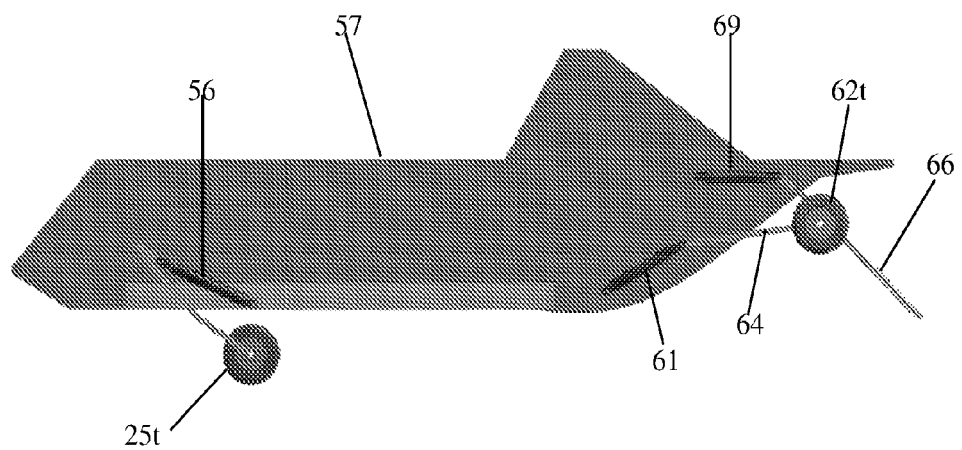
Figure 17:
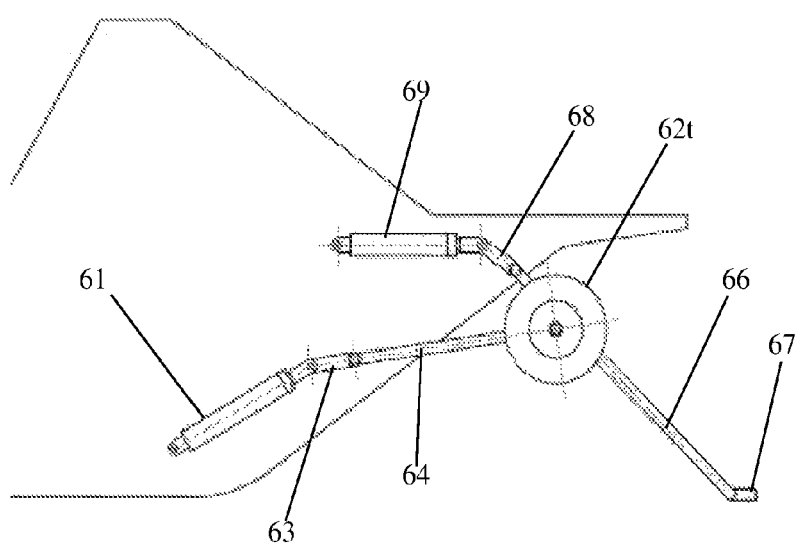
FIG. 17. Illustrates a tow hitch.

FIGS. 14-16 illustrate an embodiment of the invention where a front wheel 62 is provided and the front wheel is also movable via a ram 61. Ram 61 is again connected to a small connecting member 63 (best illustrated in FIG. 17) which is connected to the arm member 64 to which the wheel 62 is attached. Extension of the ram causes the wheel to move from the retracted stowed position to the self-drive position 25d. In this particular embodiment, a towing hitch arrangement is also provided which is best illustrated in FIG. 17. The arrangement comprises a towing strut 66 which terminates in a hitch 67. Strut 66 is connected to a small link member 68 which is connected to a strut ram 69. Extension of strut ram 69 (see FIG. 14 and FIG. 15), causes the strut 66 to be retracted against the boat hull. Retraction of strut ram 69 (see FIG. 17 and FIG. 16) causes the strut 66 to extend outwardly. In this position, the tow hitch 67 can be attached to the towing assembly of a leading vehicle (for instance a car) and the boat 57 can be towed. Specifically, and referring to FIG. 16, this is the towing configuration where the front wheel 62t is in the raised position, the strut 66 has been extended by strut ram 69, and at the rear of the boat, the rear wheels (only one illustrated) 25t have been moved by rams 56 into the towing position where the wheels are substantially underneath boat 57. In this configuration, the rear wheels 25t take a substantial portion of the weight of the boat which relieves the weight and loads on the towing strut 66.

To strengthen the strut 66, arm 64 (to which wheel 25 is attached) is attached to strut 66 in the manner illustrated in FIG. 17 when in the towing position.

Figure 18:
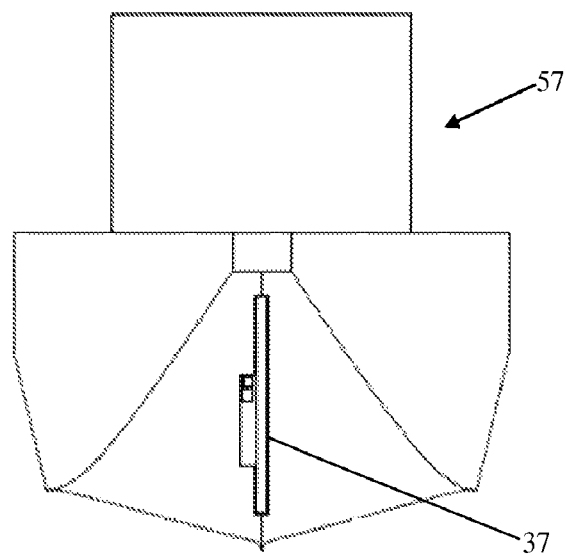
FIGS. 18-19. Illustrate the front wheel and the front slot in the boat hull.
Figure 19:
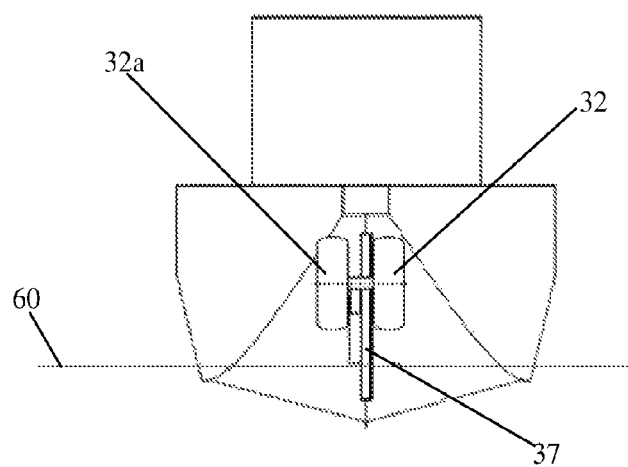

FIGS. 18 and 19 better illustrate the front of the boat having a front slot 37 for the front wheel and FIG. 19 illustrates the provision of a pair of front wheels 32a and 32b in which the waterline 60 is also shown.

Figure 20:
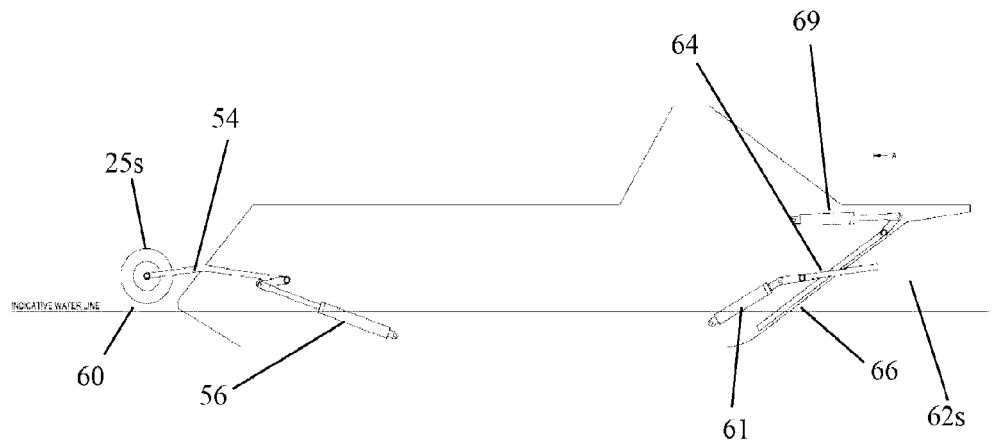
FIG. 20. Illustrates the rear wheels and the front wheel in the raised position.

FIG. 20 illustrates a side view of the boat 57 in the water position where the rear wheels 25s are in the retracted position and front wheel(s) 62s are also in the retracted position with the towing strut 66 retracted against the boat hull.

The wheels may be removable from the arm members such that if the retractable assembly is not required, the wheels can be removed and stored to reduce weight and wear and tear on the wheels.

An advantage of the retractable wheel design is that the wheels, in the "land" position have an over centre orientation relative to the pivot axis which means that the weight of the boat can assist in keeping the wheels in the land position and preventing the wheels from pivoting back to the retracted position.

Figure 21:
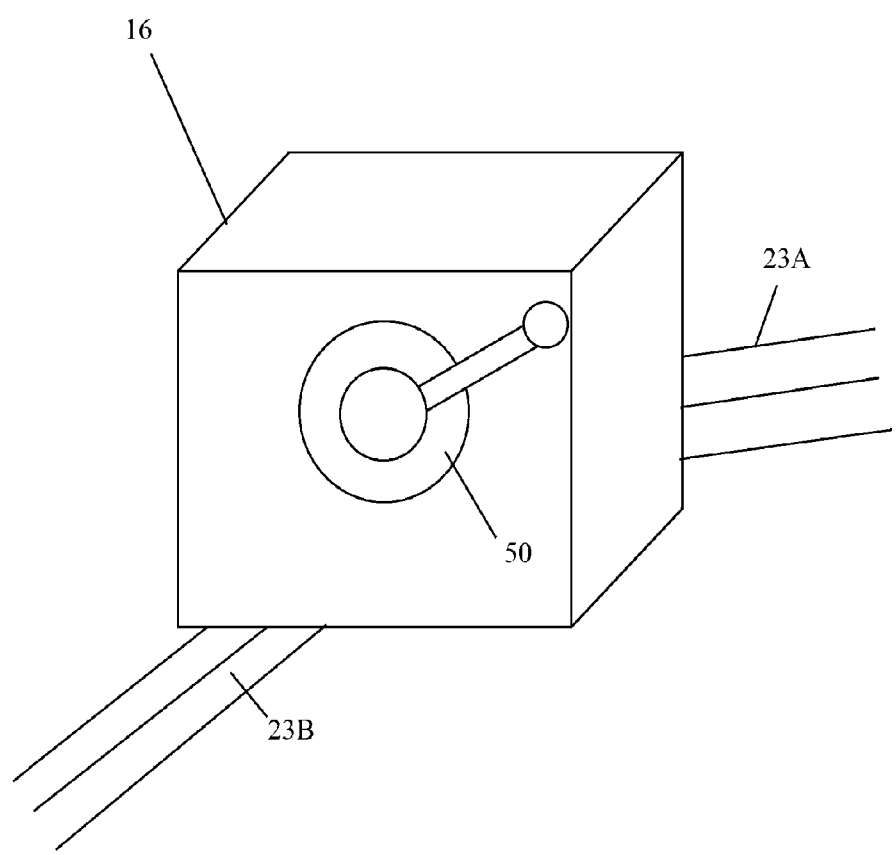
FIG. 21 Illustrates a housing with a crank handle operating the arm member.
Figures 22, 23:
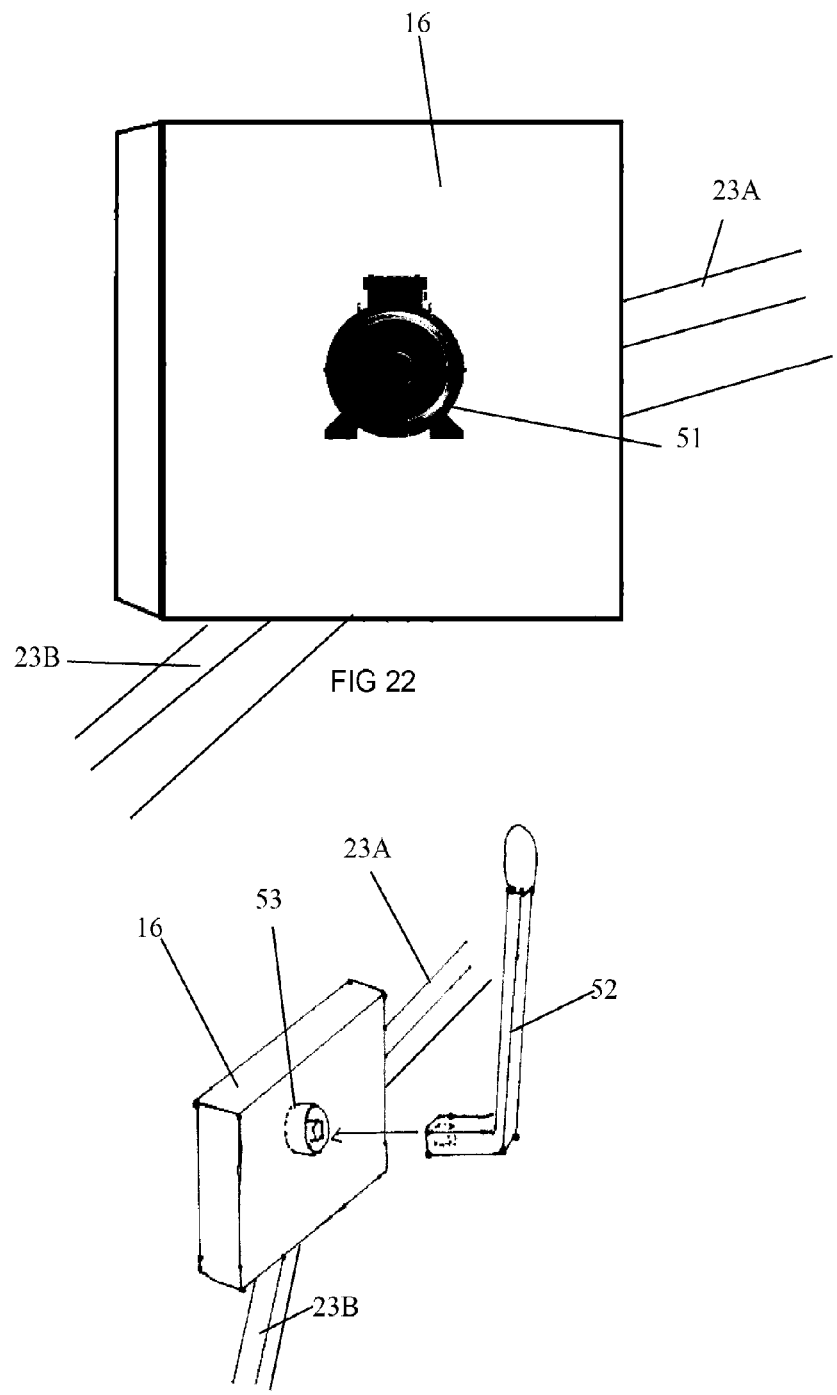
FIG. 22. Illustrates housing with an electric motor operating the arm member.
FIG. 23. Illustrates a housing with a removable handle to operate the arm member.

Instead of a handle or hydraulic rams, a wind arm 50 (see FIG. 21) or crank arm wheel or something similar may be attached relative to the arm member to wind or crank the arm member (and therefore the wheel) between the extended position 23A and retracted position 23B. A powered arrangement may also be used such as an electric motor 51 (see FIG. 22). FIG. 23 illustrates a removable L shaped handle 52 engageable to a socket 53 on housing 16, the socket being attached or being part of the pivot pin (hidden) to which arm member 23 is attached (arm member being 23A in the retracted water position and 23B in the extended land position).

Furthermore, in further alternative embodiments, each of the rear wheels 25 (that are shown in FIGS. 1-4 and 7-8 for example) may be provided in the form of tandem tyres 25A and 25B that are radially spaced from each other as shown in FIGS. 24 to 26. Furthermore, in some advantageous improvements, a track assembly 125 may also be mounted along the tandem tyres 25A and 25B as illustrated in FIGS. 24 and 26 in particular.

Once again, the pneumatic tyre 25 may be replaced with tandem tyres 25A and 25B that are radially spaced from each other as shown in the alternative embodiment illustrated in FIGS. 27 to 29. Once again, in some advantageous improvements, a track assembly 225 may also be mounted along the tandem tyres 25A and 25B.

Turning to FIGS. 27 to 29, in some alternative embodiments, two wheel assemblies may be provided in the rear portion of the hull. Each of the wheel assemblies 300A and 300B. For each of these wheel assemblies, an arm member 23 is provided which extends from a pivot 24 to where a ground wheels 25A and 25B (arranged in a tandem configuration) is attached to the arm member 23. As previously mentioned, arm member 23 is typically formed from tubular metal such as round tube or square tube to give the arm member 23 strength and rigidity. The applicant has envisioned that providing two wheel assemblies 300A and 300B in at least some embodiments may be particularly advantageous for relatively larger watercrafts. Each of the arm members 23 supports ground wheels 25A and 25B for rotation of the ground wheels. As mentioned earlier, track assembly 125 may also be optionally mounted along each set of tandem wheels 25A and 25B for providing additional ground engaging means. Turning to FIG. 29 in particular, the wheel assembly is illustrated in a stowed configuration (25s) and a drive configuration (25d). The operation of the wheel assemblies 300A and 300B is similar to the operation of the previous described embodiments.

Figure 30:
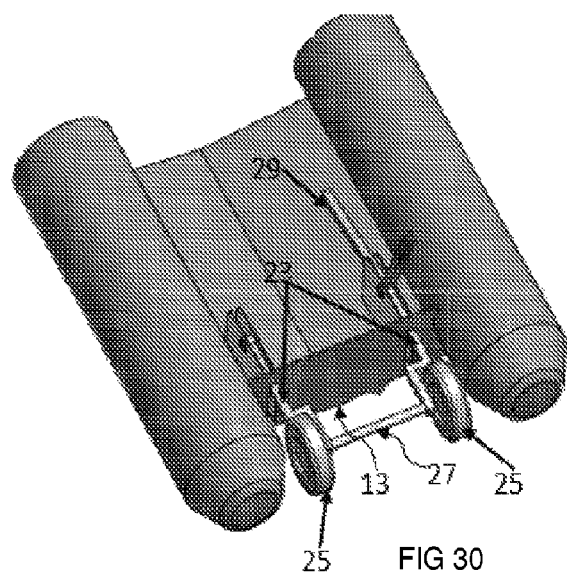
FIGS. 30 and 31 illustrate a watercraft according to an embodiment of the invention whereby a cross-bar member is provided between rear wheel assemblies so that both assemblies may be retracted or extended by means of a single operation handle.
Figure 31:
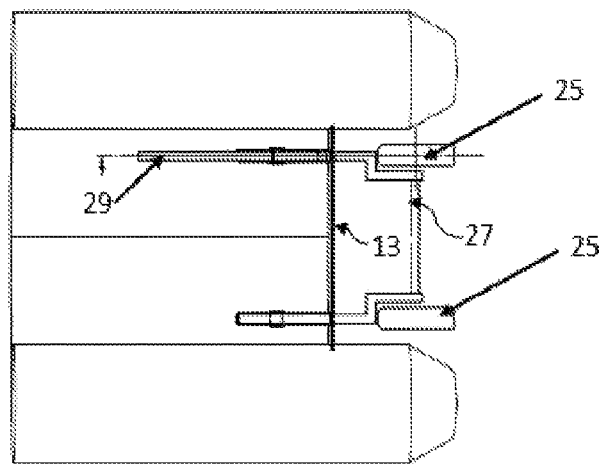

Turning to FIGS. 30 and 31, another embodiment of the invention is illustrated. Like reference numerals denote features which have been previously described. FIGS. 30 and 31 illustrate an alternative arrangement for the retractable wheel positioned at the transom of the boat. Arm member 23 pivots or hinges about pivot 24 between a retracted position and an extended position. In the retracted (water) position, the wheels 25 are extended to be generally above the waterline and, in the preferred embodiment, extending generally behind the transom 13. In the extended (land) position the wheels 25 extend underneath the hull of the boat. Each of the arm members 23 is connected by way a cross member 27 that provides additional structural strength to the retractable wheel assembly illustrated in FIGS. 30 and 31.

Retaining means may be provided to retain the wheel in the retracted position or the extended position or any intermediate position. The retaining means may comprise a pin in slot arrangement where, when the wheel is in the retracted position, an opening in the arm member aligns with an opening in a side wall of the housing 16 and a pin can be inserted to lock the arm member (and therefore the wheel) in the retracted position. Similarly, when the wheel is in the extended position, a similar pin in slot arrangement can be used to lock the wheel in the extended position. It is also possible for the handle to be fixed in position to prevent the wheel from inadvertently moving from a desired position.

FIGS. 32 to 43 depict a watercraft 75 and its various components according to a further and preferred embodiment of the present invention. The watercraft 75 includes a metal frame 77 which is located within a hull 76. As will be explained the watercraft is arranged to provide for ground contact wheels 107 to be swung from a ground contact position to a retract position and back, as indicated by the dashed line 80 in FIG. 32.

Figure 33:
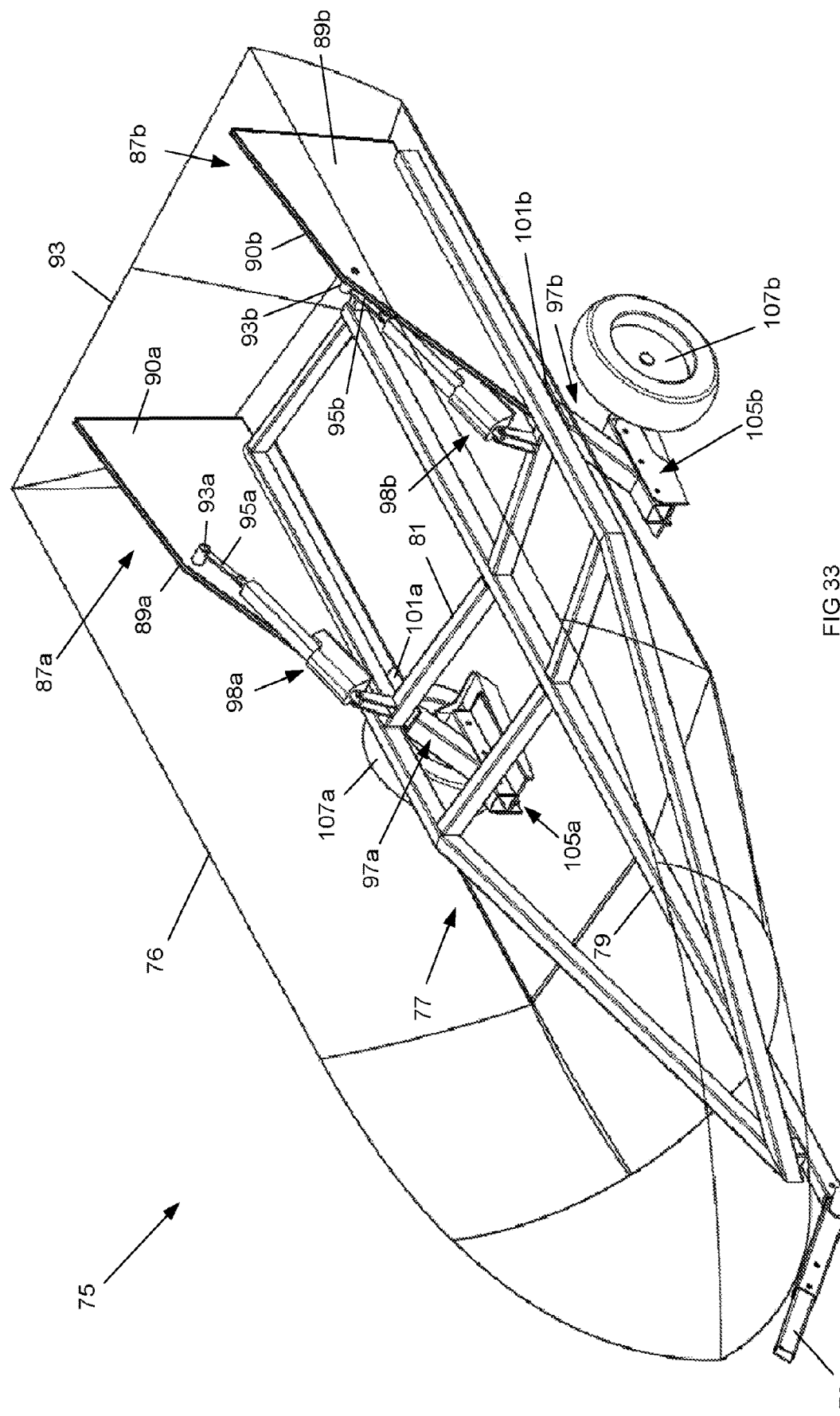
FIG. 33 is an internal view of the boat of FIG. 32.

With reference to FIG. 33 the metal frame 77 is comprised of a medial longitudinal member 79 which extends forwardly out through the hull 74 and terminates on a tow vehicle hitching assembly 78. The longitudinal member 79 is sealed watertight with the hull as it passes therethrough. The watercraft 75 includes first and second housings in the form of wheel retraction assemblies 87a and 87b. Since the wheel retraction assemblies are mirror images of each other their structure and function will be primarily described with reference to wheel retraction assembly 87a, though it will be realised that wheel retraction assembly 87b is correspondingly configured.

Figure 33A:
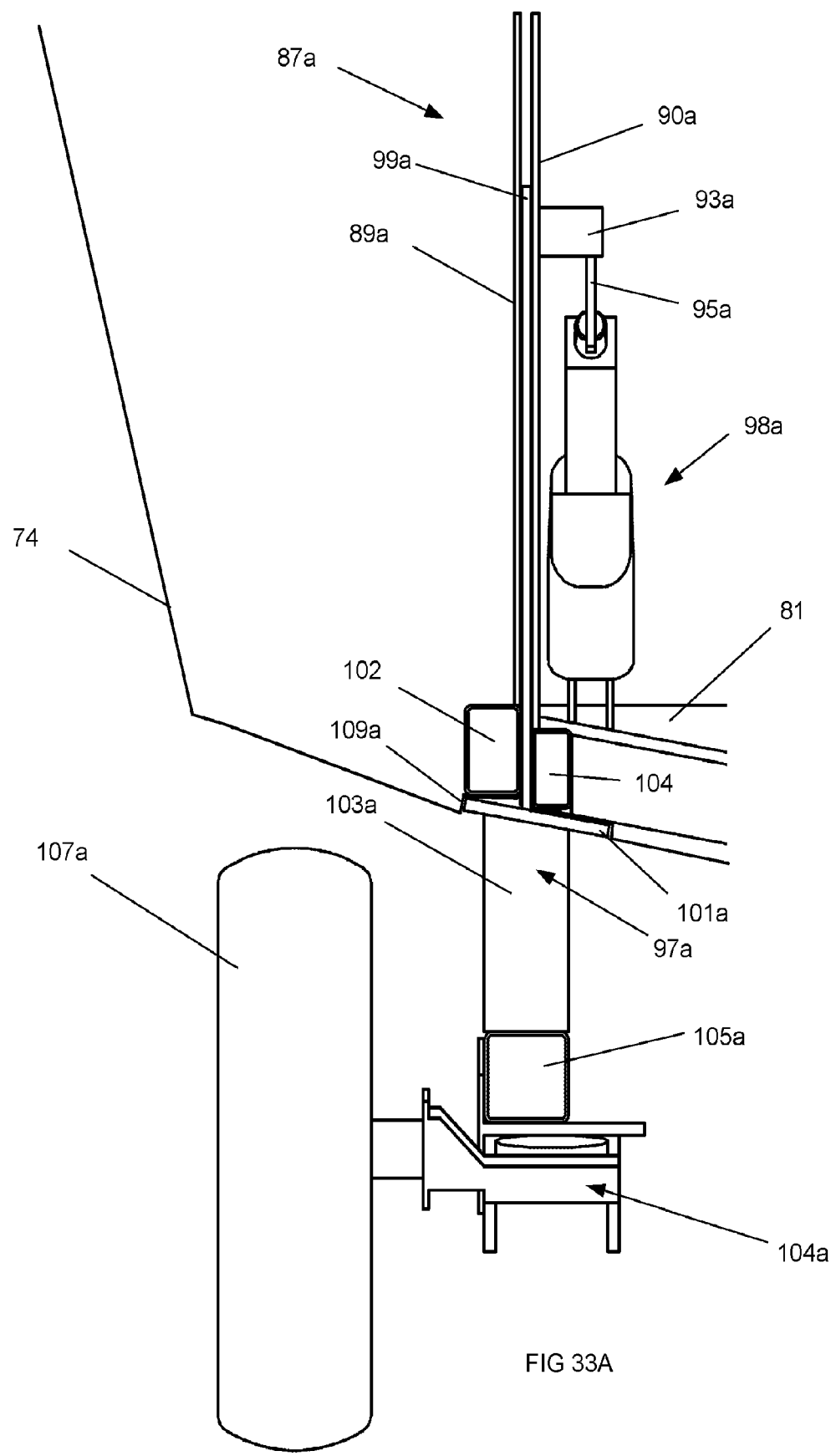
FIG. 33A is a partially cutaway detail view of the boat of FIG. 32.
Figure 35:
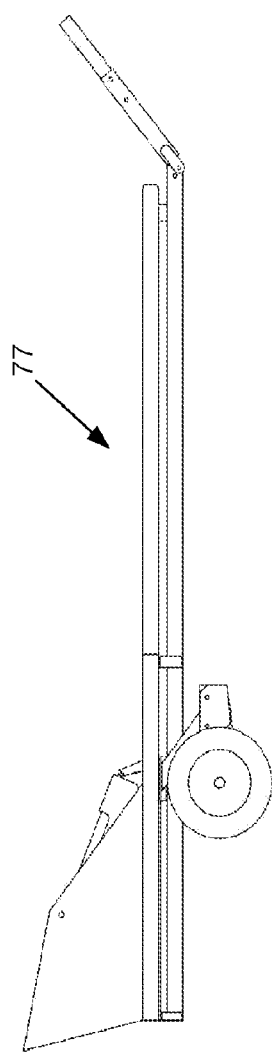
FIG. 35 is a view of the side of the frame of the boat of FIG. 32.
Figure 34:
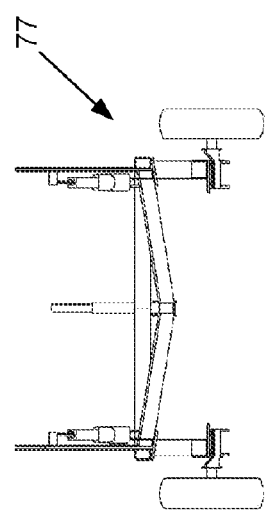
FIG. 34 is a view of the rear of a frame of the boat of FIG. 32.
Figure 37:
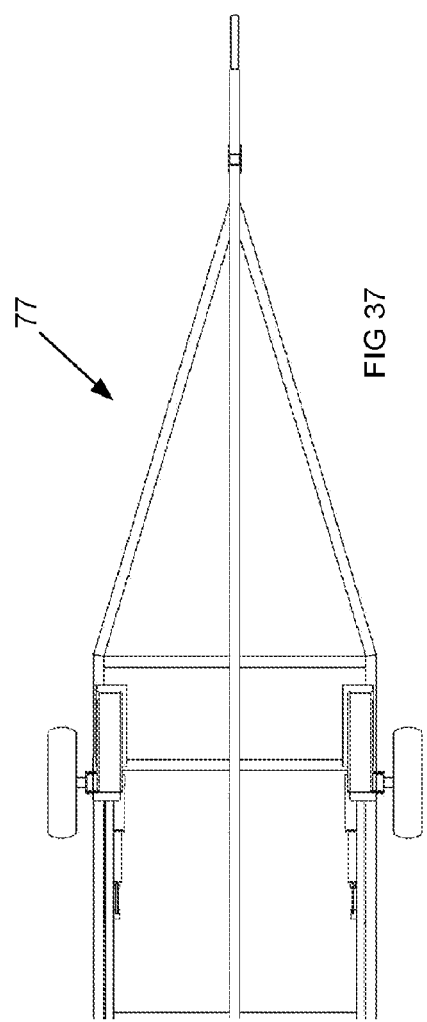
FIG. 37 is a plan view of the underside of the frame of the boat of FIG. 32.

Wheel retraction assembly 87a is comprised of a pair of spaced apart, opposed trapezoidal plates 89a, 90a. The opposed plates 89a, 90a have trailing edges that make sealing contact with opposed edges of a slot 91a (best seen in FIGS. 42 and 43) formed in a transom 93 of the watercraft 75. As best seen in FIG. 33A, the opposed plates 87a, 90a have lower edges that are mounted upon longitudinal frame members 102a, 104a which in turn make sealing contact with opposed edges of a hull slot 95a that is formed in the underside of the hull 76 and which is continuous with the transom slot 91a. The forwardly and downwardly converging edges of the opposed plates 89a and 89b are sealed over so that water entering the transom slot 91a and the hull slot 95a is prevented from proceeding into the interior of the hull.

A pivot 93a extends through an upper portion of plate 90a. The pivot 93a has a rigidly attached crank arm 95a. A linear actuator 98a (which may be hydraulic or electric) is pivotally mounted between a cross brace 81 of the frame 77 and the crank arm 95a. Accordingly, extension and retraction of the linear actuator 98a causes the pivot 93a to rotate back and forth.

Figure 36:
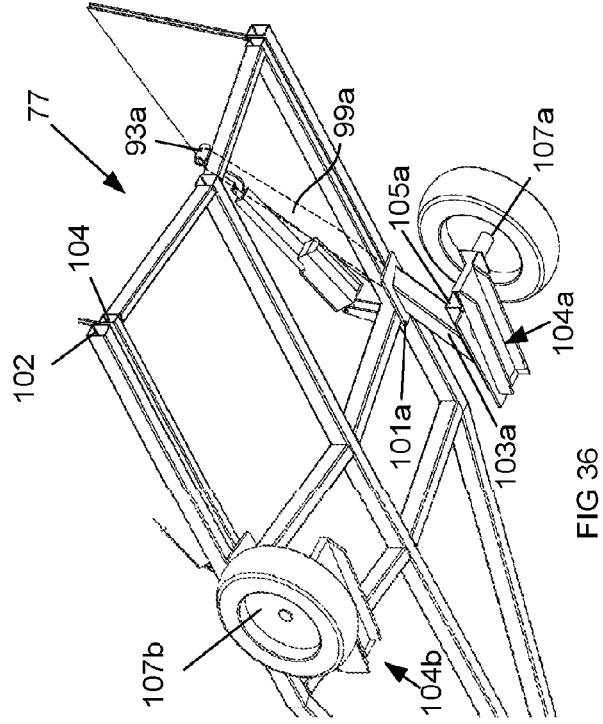
FIG. 36 is a multi-angle view of the underside of the frame of the boat of FIG. 32.

The pivot 93a extends through plate 90a into a space between plates 89a and 90a wherein it is rigidly attached to an upper end 99a of arm 97a, several views of which are shown in FIGS. 38 to 41. Arm 97a is comprised of an upper arm portion 99a that is made of metal plate which is sufficiently thin to be received between the opposed plates 89a and 90a of the wheel retraction assembly 87a. The lower end of the upper arm portion 99a terminates on an abutment plate 101a which is slanted to the upper arm at an angle that corresponds to the slope of the underside of the hull when the arm is brought to a land travelling position. A length of square cross-section, metal post 103a extends downwardly from the abutment plate 101a and terminates on a stub axle assembly mounting tube 105a to which a stub axle assembly 104a (shown in FIG. 36) is fastened. Ground contact wheel 107a is attached to the stub axle assembly 104a as shown in FIG. 36.

Figure 32:
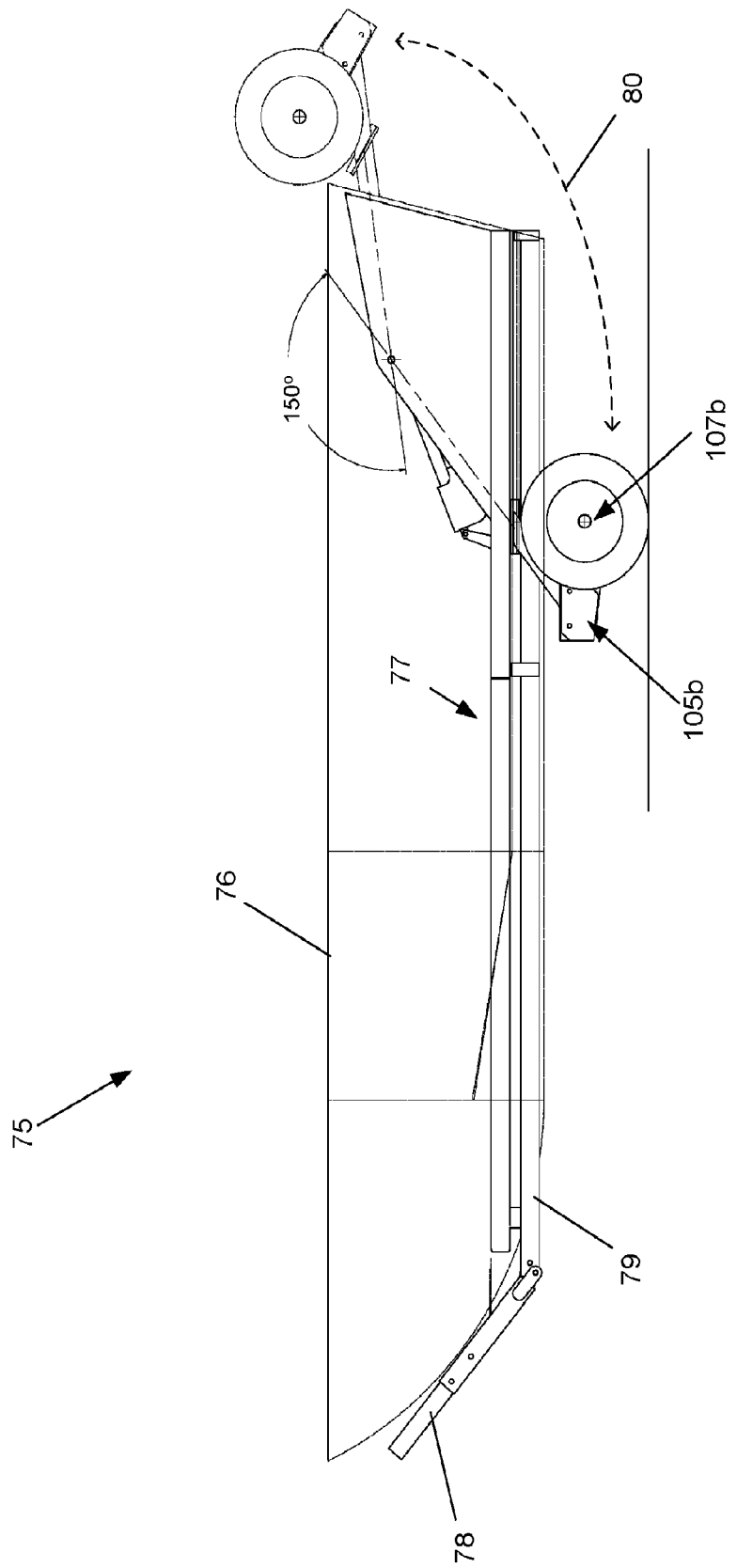
FIG. 32 is a side view of a watercraft in the form of a boat according to a further and preferred embodiment of the present invention.

Referring now to FIG. 42, there is shown a partial view of the underside of the rear end of the hull 74 on the side of the wheel retraction assembly 87a showing the watercraft 75 in the land configuration wherein the wheel 107a is located beneath the hull. The wheel 107a is brought to the ground contact configuration by withdrawing linear actuator 97a so that it pulls the crank 95a thereby rotating the pivot 93a clockwise (relative to its orientation as shown in FIG. 32) and thence causing the upper arm 99a to swing between the opposed plates 89a, 89b thereby also bringing with it the remainder of the arm 97a. The arm 97a continues to swing until an upper surface of the plate 101a is brought into abutment with the underside of the hull 74 as shown in FIG. 42. It will be noted that the hull is formed with a recess 109a that has a cross section which complements that of the plate 101a. Accordingly the plate 101a abuts the underside of the hull and is prevented from sliding sideways by the walls of the recess 109*a*. Consequently, once the watercraft 75 is brought onto land, for example as it is towed behind a vehicle in the land configuration, the weight of the watercraft is substantially borne by the abutment plate 101*a* (and the corresponding abutment plate of wheel retraction assembly 87*b*) which in turn exerts force through post 103*a* and stub axle assembly 105*a* to wheel 107*a* and thus to the ground. In effect the rear of the watercraft rests upon the abutment plates of the arms of the wheel retraction assemblies 87*a* and 87*b*. Such an arrangement is advantageous because it substantially isolates the upper arm 97*a* and pivot 93*a* from forces due to the weight of the watercraft as it is towed over land.

Figure 43:
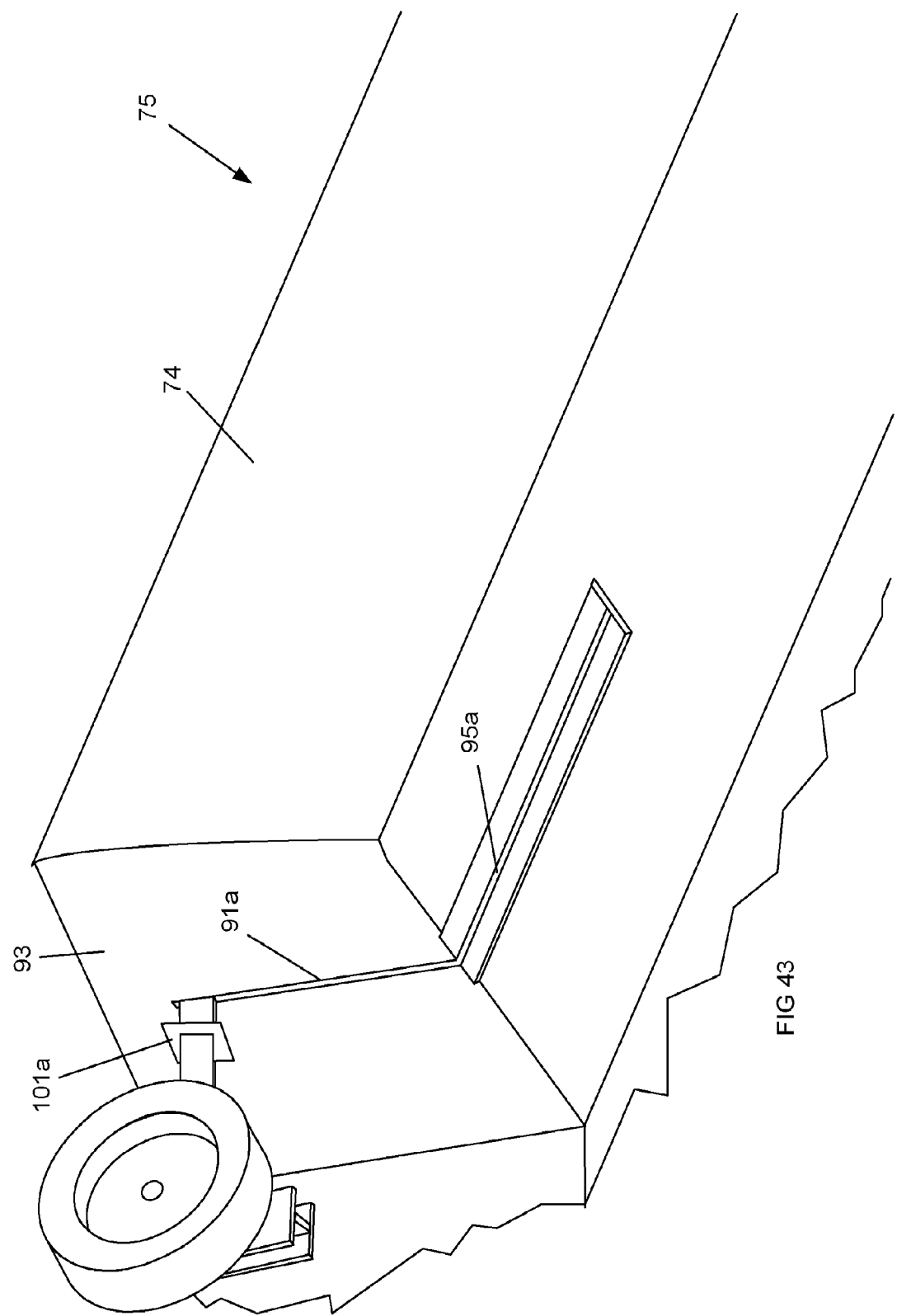
FIG. 43 is a view of the underside of the right hand side of the boat of FIG. 32 with the right hand side wheel shown in a retracted position for the boat to travel on water.

Upon arriving at a body of water the watercraft 75 may be floated in the water and the actuator 97*a* extended so that the arms 97*a*, 97*b* are swung counterclockwise (relative to the orientation shown in FIG. 32) about their respective pivots until the upper arm reaches the upper limit of the transom slots as shown in FIG. 43.

Use for the Invention

The above description identifies at least one specific, substantial and credible use for the invention namely the provision of a watercraft with wheels that may be retracted from a ground contact position, in which the vehicle may be towed, to a retracted position in which the watercraft may be sailed without interference from the wheels.

The invention described herein is in no way limited by the size of the watercraft. For example, in at least some embodiments, the invention may encompass relatively larger commercial boats (7 m to 15 m).

It should be understood that the term "watercraft" is non-limiting and encompasses a range of marine vehicles including amphibious aircraft.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A watercraft with retractable wheels, the watercraft having:
   a hull,
   an L-shaped slot extending through the hull and defining two slot portions being a first slot portion extending through the hull of the watercraft and a second slot portion extending through a transom of the watercraft, and
   an arm member supporting a wheel, the arm member extending through the slot and being pivotable between a wheel retracted position and a wheel extended position;
   wherein the L-shaped slot extends adjacent a rear part of the watercraft.

2. The watercraft as claimed in claim 1, further comprising a second L-shaped slot, also defining two slot portions being a first slot portion extending through the hull of the watercraft and a second slot portion extending through the transom, each L-shaped slot adapted to accommodate a respective said arm member to supporting a respective one of a pair of retractable rear wheels.

3. The watercraft as claimed in claim 1, comprising a front slot extending through a front part of the hull to accommodate an arm member supporting a retractable front wheel.

4. The watercraft as claimed in claim 1, comprising a housing sealingly engaged about the L-shaped slot to prevent water from entering into the watercraft, and the arm member being pivotally attached relative to the housing.

5. The watercraft of claim 1, including a handle attached to the arm member, movement of the handle causing movement of the arm member between the wheel retracted position and wheel extended position.

6. The watercraft as claimed in claim 1 including an actuator to move the arm member between the wheel retracted position and wheel extended position.

7. The watercraft of claim 6, wherein the actuator is a hydraulic ram.

8. The watercraft as claimed in claim 1 including a towing hitch.

9. The watercraft of claim 8, wherein the towing hitch comprises a towing strut adapted for movement between an extended towing position and a retracted position where the strut is adjacent the boat hull.

10. The watercraft as claimed in claim 1 including an abutment plate extending out from each arm member for abutting an underside of a hull of the watercraft in the wheel extended position to thereby support the watercraft whilst travelling on land.

11. The watercraft as claimed in claim 10 wherein the arm member comprises an upper arm portion comprised of a plate pivotally attached to the housing and a post having a greater width than the upper end for load bearing.

12. The watercraft as claimed in claim 11, wherein the abutment plate extends outwardly from between the upper arm portion and the post.

13. The watercraft as claimed in claim 10, wherein the abutment plate is slanted relative to the upper arm portion of the arm member.

14. The watercraft as claimed in claim 10, wherein the hull is formed with a recess for receiving the abutment plate in the wheel extended position to thereby locate the abutment plate in a load carrying position against the hull of the watercraft.

15. The watercraft as claimed in claim 11, wherein the housing comprises first and second spaced apart plates receiving the upper arm portion therebetween wherein the abutment plate and the post are positioned outside the hull.

16. The watercraft as claimed in claim 1, including a stub axle assembly to which the ground contact wheel is fastened, the stub axle assembly being fastened to the distal end of the post.

17. The watercraft as claimed in claim 1, including a frame disposed within a hull of the watercraft, the frame protruding through a forward portion of the hull for attachment of a hitching assembly thereto.

* * * * *